(12) United States Patent
Campomizzi et al.

(10) Patent No.: US 8,071,668 B2
(45) Date of Patent: Dec. 6, 2011

(54) BUTYL RUBBER COMPOUNDS COMPRISING A THREE COMPONENT MIXED MODIFIER SYSTEM

(75) Inventors: Ezio Campomizzi, Sarnia (CA); Ralf-Ingo Schenkel, Sarnia (CA); Lionel Cho-Young, Brights Grove (CA); Kevin Kulbaba, Leverkusen (DE)

(73) Assignee: LANXESS Inc., Sarnia, CA (US)

( * ) Notice: Subject to any disclaimer, the term of this patent is extended or adjusted under 35 U.S.C. 154(b) by 0 days.

(21) Appl. No.: 12/682,824

(22) PCT Filed: Oct. 16, 2008

(86) PCT No.: PCT/CA2008/001828
§ 371 (c)(1),
(2), (4) Date: Aug. 16, 2010

(87) PCT Pub. No.: WO2009/049413
PCT Pub. Date: Apr. 23, 2009

(65) Prior Publication Data
US 2010/0298476 A1    Nov. 25, 2010

Related U.S. Application Data

(60) Provisional application No. 60/999,667, filed on Oct. 19, 2007.

(51) Int. Cl.
*C08K 5/49* (2006.01)
*C08K 5/50* (2006.01)

(52) U.S. Cl. ........ 524/414; 524/236; 524/379; 524/493; 524/502

(58) Field of Classification Search .................. 524/236, 524/379, 493, 414, 502
See application file for complete search history.

(56) References Cited

U.S. PATENT DOCUMENTS

| | | | |
|---|---|---|---|
| 2005/0245649 A1* | 11/2005 | Parent et al. | 524/115 |
| 2007/0123619 A1* | 5/2007 | Kulbaba et al. | 524/236 |

OTHER PUBLICATIONS

Parent et al., "Isobutylene-based ionomer composite: siliceous filler reinforcement", Polymer, 45, 8091-8096 (2004).*
European search report corresponding EP 08 83 8590 pending application dated Jul. 21, 2011 (4 pages).

* cited by examiner

*Primary Examiner* — Ling-Siu Choi
(74) *Attorney, Agent, or Firm* — Michael A. Miller

(57) ABSTRACT

Rubber compounds containing a halobutyl elastomer, at least one additional elastomer, a mineral filler and at least a three component mixed modifier system comprising a silane compound, a phosphine compound and an additive containing at least one hydroxyl group and a functional group containing a basic amine. A process for preparing the compounds is also disclosed. The compounds are particularly useful in tire treads and exhibit improved processability, traction, rolling resistance and wear properties.

20 Claims, 6 Drawing Sheets

US 8,071,668 B2

BUTYL RUBBER COMPOUNDS COMPRISING A THREE COMPONENT MIXED MODIFIER SYSTEM

CROSS REFERENCE TO RELATED PATENT APPLICATIONS

The present patent application claims the right of priority under 35 U.S.C. §119 (a)-(d) and 35 U.S.C. §365 of International Application No. PCT/CA2008/001828, filed 16 Oct. 2008, which is entitled to the right of priority of U.S. Provisional Patent Application No. 60/999,667 filed on 19 Oct. 2007.

FIELD OF THE INVENTION

The present invention relates to rubber compounds containing a halobutyl elastomer, at least one additional elastomer, a mineral filler and at least a three component mixed modifier system comprising a silane compound, a phosphine compound and an additive comprising at least one hydroxyl group and a functional group comprising a basic amine. The compounds are particularly useful in tire treads and exhibit improved processability, traction and wear properties.

The present invention also relates to a process for preparing a rubber compound comprising admixing a halobutyl elastomer, at least one additional elastomer, a mineral filler and at least a three component mixed modifier system comprising a silane compound, a phosphine compound and an additive comprising at least one hydroxyl group and a functional group comprising a basic amine.

BACKGROUND

It is known that reinforcing fillers, such as carbon black and silica greatly improve the strength and fatigue properties of elastomeric compounds. It is also known that chemical interaction occurs between the elastomer and the filler. For example, good interaction between carbon black and highly unsaturated elastomers, such as polybutadiene (BR) and styrene butadiene copolymers (SBR) occurs due to the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 discloses that it is possible to produce filled butyl elastomer compositions with improved properties by combining halobutyl elastomers with silica and specific silanes. These silanes act as dispersing and bonding agents between the halogenated butyl elastomer and the filler. However, one disadvantage of the use of silanes is the evolution of alcohol during the process of manufacture and potentially during the use of the manufactured article produced by this process. Additionally, silanes significantly increase the cost of the resulting manufactured article.

Canadian Patent Application 2,339,080 discloses a process for preparing compositions containing halobutyl elastomers and organic compounds containing at least one basic nitrogen-containing group and at least one hydroxyl group, in which there is enhanced interaction between the elastomer and a filler, especially a mineral filler. Of interest were compounds containing primary amine and hydroxyl groups such as ethanolamine. While solving the problem of enhancing the interaction between elastomer and filler, the compositions have to be processed carefully to prevent any undesirable scorch of the composition. Those skilled in the art understand the term "scorch" to mean premature crosslinking of the composition during processing.

Canadian Patent Application 2,412,709 discloses a process for preparing compositions containing halobutyl elastomers, organic compounds containing at least one basic nitrogen-containing group and at least one hydroxyl group, and hydrated metal halogens. The process provides enhanced interaction between the elastomer and mineral fillers, while at the same time providing improved scorch safety. However, the traction and wear properties of the composition could still be improved upon.

Canadian Patent Application 2,418,822 discloses a process for preparing a filled halobutyl elastomer, which comprises mixing a halobutyl elastomer with at least one mineral filler that has been reacted with at least one organic compound containing at least one basic nitrogen-containing group and at least one hydroxyl group and, optionally, with at least one silazane compound. The process provides enhanced interaction between the elastomer and mineral fillers, while at the same time providing improved scorch safety. However, the traction and wear properties of the composition could still be improved upon.

Canadian patent application 2,564,446 discloses the use of a two component mixed modifier system in rubber compounds. The mixed modifier system comprises a combination of a silane modifier with a compound containing at least one hydroxyl group and a functional group containing a basic amino group. This two component modifier system was shown to have advantages over either class of modifiers used individually. The compounds exhibited improved traction properties but these materials exhibited high compound Mooney and poor processability.

In a recent publication by Parent et al (*Macromolecules*, 37 (2004) 7477-7483; *Polymer*, 45 (2004) 8091-8096.) the use of triphenyl phosphine was shown to generate a butyl 'ionomer' upon mixing in the solid state. These phosphonium bromide ionomer derivatives of an isobutylene-based elastomer (IIR-PPh$_3$Br) show improved ionic interactions with ion-exchanged montmorillonite clays leading to improved barrier properties and mechanical reinforcement. Similar increased polymer-filler interactions were observed between the ionomer and precipitated silica, resulting in reduced filler agglomeration and higher degrees of filler reinforcement.

However, there is still a need for rubber compounds useful in tire treads that exhibit improved processability, wet traction, rolling resistance and/or wear resistance.

SUMMARY OF THE INVENTION

The present invention relates to rubber compounds containing halobutyl elastomers that are useful in tire treads. Surprisingly, it has been discovered that a synergistic effect occurs in halobutyl elastomer compounds when a mixed modifier system comprising at least three components (a silane compound, a phosphine compound and an additive comprising at least one hydroxyl group and a functional group comprising a basic amine) is utilized during compounding. The properties of the resulting compound are superior to those provided by use of any single component of the mixed modifier system or any two components of the mixed modifier system. The compound has improved processability (characterized by reduced compound Mooney, and improved scorch safety) and further unexpected superior properties useful in tire tread compounds such as improved wet traction, rolling resistance (indicated by tangent delta values of the compound) and wear resistance.

According to an aspect of the present invention, there is provided a halobutyl elastomer compound comprising a halobutyl elastomer, at least one additional elastomer, a filler, and a three component mixed modifier system comprising a silane, a phosphine, and an additive comprising at least one hydroxyl group and a functional group comprising a basic amine.

According to another aspect of the present invention, there is provided a process for preparing a halobutyl elastomer compound comprising admixing a halobutyl elastomer, at least one additional elastomer, a filler and a three component mixed modifier system comprising a silane, a phosphine and an additive comprising at least one hydroxyl group and a functional group comprising a basic amine.

DETAILED DESCRIPTION OF THE INVENTION

Figure 1:
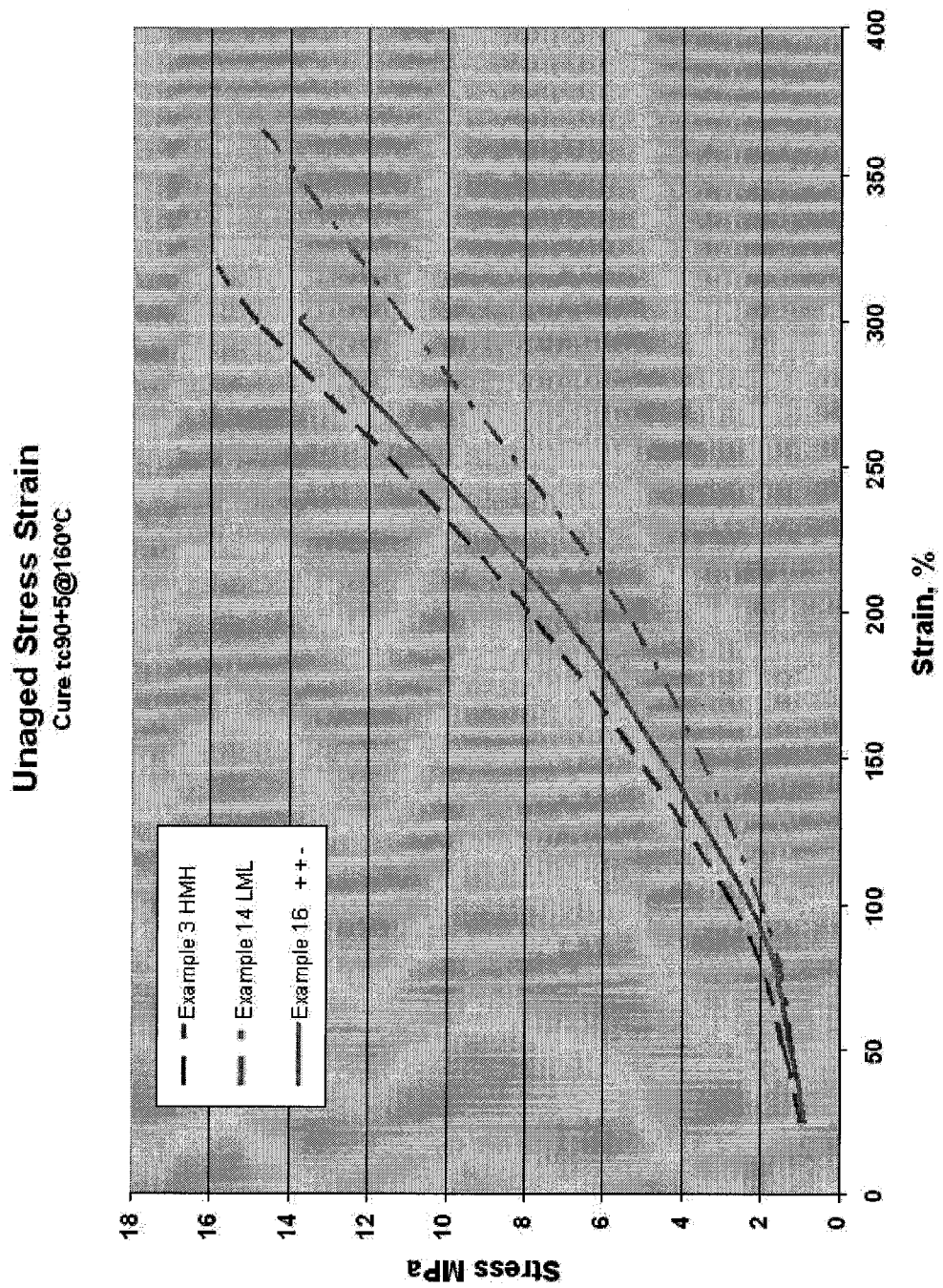
FIG. 1—illustrates stress strain of selected compounds (1-16).

The phrase "halobutyl elastomer(s)" as used herein refers to a chlorinated or brominated butyl elastomer. Brominated butyl elastomers are preferred, and the present invention is illustrated, by way of example, with reference to bromobutyl elastomers. It should be understood, however, that the present invention extends to the use of chlorinated butyl elastomers.

Halobutyl elastomers suitable for use in the present invention include, but are not limited to, brominated butyl elastomers. Such elastomers may be obtained by bromination of butyl rubber, which is a copolymer of an isoolefin monomer and a $C_4$ to $C_8$ conjugated diolefin co-monomer. Vinyl aromatic co-monomers, such as $C_1$-$C_4$ alkyl substituted styrene, may be used as additional co-monomers or as substitutes for the conjugated diolefin co-monomers. An example of a halobutyl elastomer that includes a vinyl aromatic co-monomer as a substitute for a conjugated diolefin co-monomer is brominated isobutylene methylstyrene copolymer (BIMS), in which the vinyl aromatic co-monomer is p-methylstyrene. An example of a halobutyl elastomer wherein the vinyl aromatic co-monomer is provided in addition to the conjugated diolefin co-monomer is a halogenated terpolymer of isobutylene, isoprene and p-methylstyrene, for example as disclosed in U.S. Pat. No. 6,960,632, which is incorporated herein by reference.

Isoolefins having from 4 to 7 carbon atoms are suitable for use in the present invention. Specific examples of such $C_4$ to $C_7$ isomonoolefins include isobutylene, 2-methyl-1-butene, 3-methyl-1-butene, 2-methyl-2-butene, 4-methyl-1-pentene and mixtures thereof. The most preferred $C_4$ to $C_7$ isomonoolefin monomer is isobutylene.

Suitable $C_4$ to $C_8$ conjugated diolefins include, for example, 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like, 1,3-butadiene and isoprene being most preferred. The polymer based on an isoolefin and a conjugated diolefin monomer can be a copolymer comprising one or more conjugated diene monomers, or a terpolymer comprising a conjugated diene monomer and a vinyl aromatic monomer.

If vinyl aromatic monomers are used, they should be copolymerizable with the other monomers being employed. Generally, any vinyl aromatic monomer that is known to polymerize with organo alkali metal initiators can be used. Such vinyl aromatic monomers usually contain in the range of from 8 to 20 carbon atoms, preferably from 8 to 14 carbon atoms. Examples of suitable such vinyl aromatic monomers include styrene, alpha-methyl styrene, various alkyl styrenes including p-methylstyrene, p-methoxy styrene, 1-vinylnaphthalene, 2-vinyl naphthalene, 4-vinyl toluene and the like. Although alkyl-substituted vinyl aromatic monomers are preferred, styrene is preferred for copolymerization with 1,3-butadiene alone or for terpolymerization with both 1,3-butadiene and isoprene. For co-polymerization with isobutylene or terpolymerization with isobutylene and isoprene, p-methylstyrene is the preferred alkyl-substituted vinyl aromatic monomer.

Specific examples of the previously described brominated butyl elastomers are based upon butyl elastomers containing in the range of from 0.1 to 10 weight percent, preferably from 0.5 to 5 weight percent, more preferably from about 1 to 2.5 weight percent, of repeating units derived from diolefin, preferably isoprene, in the range of from 90 to 99.9 weight percent, preferably 95 to 99.5 weight percent, more preferably from 97.5 to about 99 weight percent of repeating units derived from isoolefin, preferably isobutylene, based upon the hydrocarbon content of the polymer. After bromination, the brominated butyl elastomers contain in the range of from 0.1 to 9 weight percent, preferably 0.5 to 3.0 weight percent and more preferably from 0.75 to 2.3 weight percent bromine, based upon the bromobutyl polymer. A typical bromobutyl elastomer has a Mooney viscosity according to DIN 53 523 (ML 1+8 at 125° C.), in the range of from 25 to 60.

A stabilizer may be added to the brominated butyl elastomer. Suitable stabilizers include calcium stearate and epoxidized soy bean oil, preferably used in an amount in the range of from 0.5 to 5 parts by weight per 100 parts by weight of the brominated butyl rubber (phr).

Commercially available examples of suitable brominated butyl elastomers include LANXESS Bromobutyl 2030 (BB2030), LANXESS Bromobutyl 2040 (BB2040), and LANXESS Bromobutyl X2 commercially available from LANXESS Corporation. BB2030 has a Mooney viscosity (ML 1+8 @ 125° C.) of 32±4, a bromine content of 2.0±0.3 wt % and an approximate molecular weight of 450,000 grams per mole.

According to the present invention, the halobutyl elastomer is used in combination with another elastomer or mixture of two or more elastomers. Suitable elastomers include diene based elastomers such as, but not limited to butadiene rubber (BR), styrene-butadiene rubber (SBR, including ESBR and SSBR), nitrile-butadiene rubber (NBR, including HNBR) and natural rubber (NR, including epoxidized NR or ENR). A preferred combination includes a halobutyl elastomer, a butadiene rubber elastomer and a styrene-butadiene rubber elastomer.

According to the present invention the halobutyl elastomer compound is reinforced with at least one mineral filler. The mineral filler may be provided as a single type of filler or as a combination of fillers, including a combination that includes a mineral filler and a non-mineral filler, such as carbon black. Preferred mineral fillers comprise, for example, silica, silicates, clay (such as bentonite), gypsum, alumina, titanium dioxide, talc and the like, as well as mixtures thereof.

Further examples of suitable mineral fillers include:
highly dispersive silicas, prepared e.g. by the precipitation of silicate solutions or the flame hydrolysis of silicon halides, with specific surface areas of 5 to 1000, preferably 20 to 400, more preferably 100 to 250 m$^2$/g (BET specific surface area), and with primary particle sizes of 10 to 400 nm; the silicas can optionally also be present as mixed oxides with other metal oxides such as Al, Mg, Ca, Ba, Zn, Zr and Ti;
synthetic silicates, such as aluminum silicate and alkaline earth metal silicate;
magnesium silicate or calcium silicate, with BET specific surface areas of 20 to 400 m$^2$/g and primary particle diameters of 10 to 400 nm;
natural silicates, such as kaolin and other naturally occurring silica;
glass fibers and glass fiber products (matting, extrudates) or glass microspheres;
metal oxides, such as zinc oxide, calcium oxide, magnesium oxide and aluminum oxide;
metal carbonates, such as magnesium carbonate, calcium carbonate and zinc carbonate;
metal hydroxides, e.g. aluminum hydroxide and magnesium hydroxide or combinations thereof.

Because these mineral particles have hydroxyl groups on their surface, rendering them hydrophilic and oleophobic, it is difficult to achieve good interaction between the filler particles and the butyl elastomer. For many purposes, the preferred mineral is silica, especially highly dispersive silica, for example silica prepared by the carbon dioxide precipitation of sodium silicate.

Dried amorphous silica particles suitable for use as mineral fillers in accordance with the present invention have a mean agglomerate particle size in the range of from 0.1 to 100 microns, preferably between 0.5 and 50 microns and more preferably between 1.0 and 25 microns. It is preferred that less than 10 percent by volume of the agglomerate particles are below 0.5 microns or over 50 microns in size. A suitable amorphous dried silica has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S and Vulkasil N, commercially available from Bayer AG, as well as highly dispersible silica types such as, for example but not limited to, Zeosil 1165 MP (Rhodia) and Ultrasil 7005 (Degussa), and the like.

Mineral fillers can also be used in combination with known non-mineral fillers, such as
carbon blacks; suitable carbon blacks are preferably prepared by the lamp black, furnace black or gas black process and have BET specific surface areas of 20 to 200 m$^2$/g, for example, SAF, ISAF, HAF, FEF or GPF carbon blacks; or
rubber gels, preferably those based on polybutadiene, butadiene/styrene copolymers, butadiene/acrylonitrile copolymers and polychloroprene.

Non-mineral fillers may be present in an amount up to 60 phr. It is preferred that the mineral filler should constitute at least 35% by weight of the total amount of filler. If the halobutyl elastomer composition of the present invention is blended with another elastomeric composition, that other composition may contain mineral and/or non-mineral fillers.

The first of three classes of compounds used as a part of the mixed modifier system of the present invention includes a silane compound. The silane compound useful in the mixed modifier of the present invention is preferably an aminosilane, a vinyl silane, or a sulphur-containing silane. Preferred aminosilanes are those of Formula I zo defined in PCT international application PCT/CA98/00499, published on 26 Nov. 1998 as WO98/53004, which is incorporated herein by reference, and acid addition salts and quaternary ammonium salts of such aminosilanes.

  Formula I $R_1$, $R_2$ are selected from linear or branched alkyls or aryl groups, A is a linear or branched alkyl or aryl group (bridging group), $R_3$ is selected from linear or branched alkoxy or aryloxy groups and $R_4$ and $R_5$ are selected from linear or branched alkyls or aryl groups, or linear or branched alkoxy or aryloxy groups.

Suitable aminosilanes of Formula I include, but are not limited to:
3-aminopropyltriethoxysilane
3-aminopropyltrimethoxysilane
3-aminopropylmethyldiethoxysilane,
3-aminopropyldiisopropylethoxysilane,
N-(6-aminohexy)aminopropyltrimethoxysilane,
4-aminobutyltriethoxysilane,
4-aminobutyldimethylmethoxysilane,
3-aminopropyltris(methoxyethoxyethoxy)silane,
3-aminopropyldiisopropylethoxysilane,
N-(6-aminohexyl)aminopropyltrimethoxysilane,
4-aminobutyltriethoxysilane, and
(cyclohexylaminomethyl)-methyldiethoxysilane.

Suitable alternative aminosilanes which have additional functionality (ie. diamine, triamine, or vinyl groups) include, but are not limited to:
N-2-(vinylbenzylamino)-ethyl-3-aminopropyl-trimethoxysilane,
N-(2-aminoethyl)-3-aminopropyltrimethoxysilane,
trimethoxysilylpropyldiethylenetriamine,
N-2-(aminoethyl)-3 aminopropyltris(2-ethylhexoxy)-silane,
triethoxysilylpropyl-diethylenetriamine,
N-(2-aminoethyl)-3-aminopropyltrimethoxysilane,
N-2-(aminoethyl)-3-aminopropyltris(2-ethylhexoxy)-silane, The aminosilanes described above (including those of formula I) can be used as the free base, or in the form of its acid addition or quaternary ammonium salt. Non-limiting examples of suitable salts of aminosilanes of formula I include:

N-oleyl-N-[(3-triethoxysilyl)propyl]ammonium chloride,
N-3-aminopropylmethyldiethoxy-silane hydrobromide,
(aminoethylaminomethyl)phenyltrimethoxysilane hydrochloride,
N-[(3-trimethoxysilyl)propyl]-N-methyl,
N-N-diallylammonium chloride,
N-tetradecyl-N,N-dimethyl-N-[(3-trimethoxysilyl) propyl]ammonium bromide
3[2-N-benzylaminoethyl-aminopropyl]trimethoxysilane hydrochloride,
N-octadecyl-N,N-dimethyl-N-[(3-tri-methoxysilyl) propyl]ammonium bromide,
N-[(trimethoxysilyl)propyl]-N-tri(n-butyl)ammonium chloride,
N-octadecyl-N-[3-triethoxysilyl)propyl]ammonium chloride,
N-2-(vinylbenzylamino)ethyl-3-aminopropyl-trimethoxysilane hydrochloride,
N-2-(vinylbenzylamino)ethyl-3-aminopropyl-trimethoxysilane hydrochloride and
N-oleyl-N-[(3-trimethoxysilyl)propyl]ammonium chloride.

The silane compound may be a sulphur-containing silane compound. Suitable sulphur-containing silanes include those described in U.S. Pat. No. 4,704,414, in published European patent application 0,670,347 A1 and in published German patent application 4435311 A1, which are all incorporated herein by reference.

Preferred sulphur containing silanes comprise a sulfane moiety or comprise a mixture of compounds comprising a sulfane moiety. One suitable example is a mixture of bis[3-(triethoxysilyl)propyl]-monosulfane, bis[3(triethoxysilyl)propyl]disulfane, bis[3-(triethoxysily)propyl]trisulfane and bis[3(triethoxysilyl)propyl]tetrasulfane, or higher sulfane homologues, available under the trademarks Si-69™ (average sulfane 3.5), Silquest™ A-1589 (from CK Witco) or Si-75™ (from Evonik, formerly Degussa) (average sulfane 2.0). Another suitable example is bis[2-(triethoxysilyl)ethyl]-tetrasulfane, available under the trade-mark Silquest™ RC-2. Other suitable silane compounds include those with mercapto or thio functionality provided in conjunction with bulky ether groups and a monoethoxy group for binding to the silica surface; a non limiting example of such a compound is 3-(Triethoxysilyl)propanthiol, which is commercially available under the trade name Silane VP Si 363™ (from Evonik, formerly Degussa).

Other suitable sulphur-containing silanes include compounds of formula

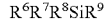

in which at least one of $R^6$, $R^7$ and $R^8$, preferably two of $R^6$, $R^7$ and $R^8$ and most preferably three of $R^6$, $R^7$ and $R^8$, are hydroxyl or hydrolysable groups. The groups $R^6$, $R^7$ and $R^8$ are bound to the silicon atom. The group $R^6$ may be hydroxyl or $OC_pH_{2p}+1$ where p is from 1 to 10 and the carbon chain may be interrupted by oxygen atoms, to give groups, for example of formula $CH_3OCH_2O-$, $CH_3OCH_2OCH_2O-$, $CH_3(OCH_2)_4O-$, $CH_3OCH_2CH_2O-$, $C_2H_5OCH_2O-$, $C_2H_5OCH_2OCH_2O-$, or $C_2H_5OCH_2CH_2O-$. Alternatively, $R^8$ may be phenoxy. The group $R^7$ may be the same as $R^6$. $R^7$ may also be a $C_{1-10}$ alkyl group, or a $C_{2-10}$ mono- or diunsaturated alkenyl group. Further, $R^7$ may be the same as the group $R^9$ described below.

$R^8$ may be the same as $R^6$, but it is preferred that $R^6$, $R^7$ and $R^8$ are not all hydroxyl. $R^8$ may also be $C_{1-10}$ alkyl, phenyl, $C_{2-10}$ mono- or diunsaturated alkenyl. Further, $R^8$ may be the same as the group $R^9$ described below.

The group $R^9$ attached to the silicon atom is such that it may participate in a crosslinking reaction with unsaturated polymers by contributing to the formation of crosslinks or by otherwise participating in crosslinking. $R^9$ may have the following structure:

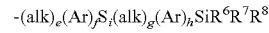

where $R^6$, $R^7$ and $R^8$ are the same as previously defined, alk is a divalent straight hydrocarbon group having between 1 and 6 carbon atoms or a branched hydrocarbon group having between 2 and 6 carbon atoms, Ar is either a phenylene $-C_6H_4-$, biphenylene $-C_6H_4-C_6H_4-$ or $-C_6H_4-OC_6H_4$-group and e, f, g and h are either 0, 1 or 2 and i is an integer from 2 to 8 inclusive with the provisos that the sum of e and f is always 1 or greater than 1 and that the sum of g and h is also always 1 or greater than 1. Alternately, $R^9$ may be represented by the structures $(alk)_e(Ar)_fSH$ or $(alk)_e(Ar)_f$-SCN where e and f are as defined previously.

Preferably, $R^6$, $R^7$ and $R^8$ are all either $OCH_3$, $OC_2H_5$ or $OC_3H_8$ groups and most preferably all are $OCH_3$ or $OC_2H_5$ groups. sulphur Non-limiting illustrative examples of these sulphur-containing silanes include the following:
3-octanoylthio-1-propyltriethoxysilane (Silane NXT)
bis[3-(triethoxysilyl)propyl]disulfane,
bis[2-(trimethoxysilyl)ethyl]tetrasulfane,
bis[2-(triethoxysilyl)ethyl]trisulfane,
bis[3-(trimethoxysilyl)propyl]disulfane,
3-mercaptopropyltrimethoxysilane,
3-mercaptopropylmethyldiethoxysilane, and
3-mercaptoethylpropylethoxymethoxysilane.

The second of three classes of compounds used as a part of the mixed modifier system of the present invention is a phosphine of the basic structure:

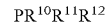

in which $R^{10}$, $R^{11}$, $R^{12}$ can be the same or combinations of any $C_1$ to $C_{20}$ alkylene group which may be linear or branched or possibly an aromatic group ($-C_6H_5$) or a substituted aromatic group. Suitable phosphines include trimethylphosphine, triethylphosphine, triisopropylphosphine, tri-n-butylphosphine, and triphenylphosphine. The most preferred of these is triphenylphosphine.

The third of three classes of compounds used as a part of the mixed modifier system of the present invention includes an additive comprising at least one hydroxyl group and at least one functional group containing a basic amine. Preferably, this modifier contains at least one primary alcohol group and an amine group separated by methylene bridges, which may be branched. Such compounds have the general formula $HO-A-NR^{13}R^{14}$; wherein $R^{13}$ and $R^{14}$ are selected from linear or branched alkyl or aryl groups, and wherein A is a $C_1-C_{20}$ alkylene group that may be linear or branched, may contain ether linkages, or may contain an additional alcohol moiety. Preferably the number of methylene groups between the two functional groups should be in the range of from 1 to 4. Preferred additives comprise aminoalcohols or aminodiols. Examples of such preferred additives include monoethanol amine (MEA), N,N-dimethylaminoethanol (DMAE), diethanolamine (DEA), dibutylamino-ethanol (DBAE), methyldiethanolamine (MDEA) and phenyldiethanolamine (PDEA).

Preferred combinations of three modifiers for use in the present invention include: triphenylphosphine, N,N-dimethylaminoethanol and Si69™ silane modifiers; triphenylphosphine, dibutylaminoethanol and Si69™ silane modifiers; and, triphenylphosphine, phenyldiethanolamine and Si69™ silane modifiers.

The amount of filler to be incorporated into the halobutyl elastomer compound may vary between wide limits. Typical amounts of filler range from 20 parts to 250 parts, preferably 30 parts to 100 parts, more preferably from 65 to 85 parts per hundred parts of elastomer. For a compound with 75 phr mineral filler (silica) the amount of the phosphine additive is in the range from about 0.1 to 8.0 phr, the amount of aminoalcohol additive is in the range from about 0.1 to 8.0 phr and the amount of silane is in the range from about 0.1 to 8.0 phr.

More specifically, for a compound with 75 phr mineral filler (silica) the amount of phosphine (specifically, triphenylphosphine) additive present in the mixed modifier system is in the range from about 0.1 to 6.0 phr, more preferably from about 1.0 to 4.0 phr and even more preferably from about 1.5 to 2.5 phr. The amount of the aminoalcohol (specifically, N,N-dimethylaminoethanol) additive present in the mixed modifier system is in the range from about 0.1 to 6.0 phr, more preferably from about 0.5 to 3.0 phr, even more preferably from about 0.8 to 2.5 phr, and most preferably from about 1.0 to 2.0 phr. The amount of the silane compound (specifically, a silane comprising bis[3(triethoxysilyl)propyl]tetrasulfane) in the mixed modifier is in the range from about 0.1 to 15.0 phr, more preferably from about 1.0 to 6.0 phr, even more preferably from about 2.5 to 5.5 phr and most preferably from about 3.0 to 4.5 phr. The amount of modifiers in the mixture will increase and decrease according to the amount of mineral filler (e.g. silica) in the compound. For example, if the amount of silica in the compound is decreased, then the amount of the three modifiers should also decrease. Similarly, if there is an increase in the amount of silica, then the amount of the three modifiers should also increase. It should also be noted that by selecting different compounds from each of the modifier classes, the final amounts (phr) added of each compound may vary depending on the molecular weight differences from the general chemical structures.

In one embodiment, rubber compounds prepared according to the present invention may have the following desirable combination of properties: a tan delta at 0° C. of greater than or equal to 0.325; a tan delta at 60° C. of less than or equal to 0.120; an abrasion volume loss (DIN) of less than or equal to 165 mm$^3$; and, a tensile at break value of greater than 13.0 MPa. In another embodiment, rubber compounds prepared according to the present invention may have the following properties, taken alone or in any desirable combination: a Mooney viscosity (ML 1+4 @ 100° C.) of from 20 to 85; a Mooney Scorch (MS LR @ 125° C., t05 min) of >30; an MDR cure (1.7 Hz, 1° arc, 160° C., 30 min, 100 dNm) of from 20 to 45 (MH) or 2 to 9 (ML); an ultimate elongation of from about 150% to about 700%; a Shore A2 hardness of from 40 to 90 points; a DIN abrasion (t90+10) of from 50 to 200 mm$^3$; and, a tan δ @ 0° C. of from 0.1 to 0.70. In yet another embodiment, rubber compounds prepared according to the present invention may have the following properties, taken alone or in any desirable combination: a Mooney viscosity (ML 1+4 @ 100° C.) of from 56.9 to 90.8, preferably from 56.9 to 76.0; a Mooney Scorch (MS LR @ 125° C., t05 min) of from 12.4 to >30, preferably from 15.0 to >30; an MDR cure (1.7 Hz, 1° arc, 160° C., 30 min, 100 dNm) of from 23.9 to 32.3 (MH) or 3.4 to 6.4 (ML); an ultimate elongation of from 178% to 367%; a Shore A2 hardness of from 53 to 59 points; a DIN abrasion (t90+10) of from 83 to 135 mm$^3$, preferably from 83 to 116 mm$^3$; and, a tan δ @ 0° C. of from 0.32 to 0.43.

According to the present invention the elastomers, filler(s) and mixed modifier system containing a silane compound, a phosphine and an additive having at least one hydroxyl group and a functional group containing a basic amine are mixed together, suitably at a temperature in the range of from 25 to 200° C. Normally the mixing time does not exceed one hour. The mixing can be carried out on a variety of mixing equipment known to those skilled in the art such as a two-roll mill mixer, a Brabender mixer or a miniature internal mixer, or on production scale mixers using tangential or intermeshing rotor configurations, or on a continuous mixing extruder. The mixed modifier system can be pre-mixed or can be mixed during compounding of the elastomers and filler. A particularly preferred mixing method employs three stages. In this embodiment, the elastomers and mineral filler are mixed first, followed by the three component mixed modifier system (either pre-mixed or mixed in situ), followed by other agents useful in compounding of butyl rubber. Alternatively, addition of the filler and modifiers may be split into multiple loading cycles to facilitate dispersion and incorporation of the filler and modifier into the elastomer blend.

EXAMPLES

Testing

Hardness and Stress Strain Properties were determined with the use of an A-2 type durometer following ASTM D-2240 requirements. The stress strain data was generated at 23° C. according to the requirements of ASTM D-412 Method A. Die C dumbbells cut from 2 mm thick tensile sheets (cured for tc90+5 minutes at 160° C.) were used. DIN abrasion resistance was determined according to test method DIN 53516. Sample buttons for DIN abrasion analysis were cured at 160° C. for tc90+10 minutes. Dynamic test specimens were cured at 160° C. for t90+5 minutes. Samples were tested using a GABO Eplexor to obtain dynamic response measured from −100° C. to +100° C. using a frequency of 10 Hz and a dynamic strain of 0.1%. Mooney scorch was measured at 125° C. with the use of an Alpha Technologies MV 2000 according to ASTM 1646 with a large rotor. The tc90 times were determined according to ASTM D-5289 with the use of a Moving Die Rheometer (MDR 2000E) using a frequency of oscillation of 1.7 Hz and a 1° arc at 160° C. for 30 minutes total run time. Curing was achieved with the use of an Electric Press equipped with an Allan-Bradley Programmable Controller.

Compounds were prepared using standard mixing practices, but employing a three stage mix. The examples were prepared, according to the formulations given in Table 1, with the use of a 1.5 L BR-82 Banbury internal mixer equipped with tangential rotors. The temperature was first allowed to stabilize at 40° C. With the rotor speed set at 70 rpm, ingredients ½ A, then 1B and then ½ A were introduced into the mixer followed by 1 C after 0.5 min. After 1.5 minutes, ingredients 1D were added to the mixer. After 3.5 minutes (or 135° C.) a sweep of the ram was performed. After 5.5 minutes (or 150° C.) a sweep was performed. The compound was dumped after a total mix time of 6.5 minutes, and sheeted out and allowed to rest for 24 hours. During the second stage to the BR-82 Banbury internal mixer with a rotor speed set to 70 rpm was added ½ stage 1 masterbatch, followed by the ingredients 2A then the remainder of stage 1 masterbatch. After mixing for 3 minutes (or 165° C.) the compound was dumped and sheeted out on a mill. The curatives 3A were then added onto a rolling bank and dispersed using % cuts and refined with a minimum of 6 endwise passes on a two-roll mill.

Examples 1-15

Examples 1-15 are a result of a Box-Behnken response surface design of experiments (DOE) based on initial studies indicating that the ranges of interest for these three modifiers:

| Silane, Si69 ™ | (1.40, 2.80 and 4.20 phr) |
| N,N-Dimethylaminoethanol (DMEA) | (0.45, 0.90 and 1.35 phr) |
| Triphenylphosphine (PPh₃) | (1.32, 2.65 and 3.97 phr) |

Those skilled in the art may choose alternate modifiers within these three classes of modifiers with due consideration of the relative molar masses and reactivities of the specific modifiers chosen as well as the total of active mineral filler loadings.

These experiments were used to determine the influence of these modifiers on tread properties of interest. With the data generated from these examples, a model was generated and used to predict the physical test results for compound 16. The results of the model for selected properties and the accuracy will now be discussed.

The compound viscosity (ML at 100° C.) for examples 1-15 were within the range of 57 to 91 MU, the lower the values, the better for processing and handling of the compounds. The predictive model has a $R^2$ value of 0.8408, and the predicted value for example 16 was 59.5 MU compared to the actual value of 61.8 MU. The most significant parameters for the compound viscosity are the amount of silane (S), amino alcohol (D) and triphenylphosphine (T) in the compound formulations. This study indicates that in order to reach a suitable viscosity for processing of the compound that all three modifiers are required.

The compound scorch time (MDR ts2 at 160° C.) for examples 1-15 were within the range of 0.99 to 3.15, the higher the values, the better for processing and handling of the compounds. The predictive model has a $R^2$ value of 0.8226, and the predicted value for example 16 was 2.35 minutes compared to the actual value of 2.28 minutes. The most significant parameters for the compound scorch time are the amount of silane (S), amino alcohol (D) and triphenylphosphine (T) in the compound formulations. This study indicates that in order to reach a suitable scorch safety all three modifiers are required.

The compound elongation for examples 1-15 were within the range of 150 to 369%, with a minimum value of about 300% required for tread compounds, and the higher values in general the better. The predictive model has a $R^2$ value of 0.8936, and the predicted value for example 16 was 327% compared to 302%. The most significant parameters for the compound elongation are the amount of silane (S), amino alcohol (D) and triphenylphosphine (T) in the compound formulations. This study indicates that the combination of the three modifiers is can meet the criteria of compound elongation for tread applications and all effect the ultimate elongation of the compound.

The compound abrasion (volume loss, using DIN method) is an important parameter for butyl based tread compounds. The abrasion loss for examples 1-15 were within the range of 135 to 83 mm³ with the lower the amount of abraded rubber being preferred for tread applications. The predictive model has an $R^2$ value of 0.9326, and the predicted value for example 16 was 105 mm³ compared to the actual value of 96 mm³. The most significant variables influencing the abrasion resistance were the amount of silane (S), amino alcohol (D) and triphenylphosphine (T) in the compound formulations. This study indicates that in order to maximize the abrasion resistance a combination of all three modifiers is required.

Table 2 shows the tan delta response of filled butyl-SBR-BR elastomer compounds of Examples 1-16 at select temperatures. The tangent delta values measured at relatively low temperatures (ie below 10° C.) for a compound can be a useful predictor for the traction properties for tread applications. In general, at 0° C., the higher the tangent delta value, the better the predicted wet traction. The tan delta values for examples 1-15 were within the range of 0.3265 to 0.4260 with the higher values being preferred for tread applications. The predictive model has a $R^2$ value of 0.9049, and the predicted value for example 16 was 0.3836 compared to the actual value of 0.3818. The most significant parameters for the tangent delta values near 0° C. are the amount of silane (S) and the amount of triphenylphosphine (T) in the compound formulations.

Examples 1-15
(Mixed Modifiers; DMEA, Si-69, PPh₃)

TABLE 1

Formulations of Compounds 1-16.

| | | Ingredients (phr) | | | | | | | |
|---|---|---|---|---|---|---|---|---|---|
| | Tag | 1 | 2 | 3 | 4 | 5 | 6 | 7 | 8 |
| BUNA ™ CB 25 | 1A | 30 | 30 | 30 | 30 | 30 | 30 | 30 | 30 |
| LANXESS ® BROMOBUTYL 2030 | 1A | 35 | 35 | 35 | 35 | 35 | 35 | 35 | 35 |
| NIPOL NS 116 R (SSBR) | 1A | 35 | 35 | 35 | 35 | 35 | 35 | 35 | 35 |
| ZEOSIL 1165 MP | 1B | 25 | 25 | 25 | 25 | 25 | 25 | 25 | 25 |
| CARBON BLACK, N 234 VULCAN 7H | 1C | 5 | 5 | 5 | 5 | 5 | 5 | 5 | 5 |
| SILANE SI-69 ® | 1C | 4.20 | 2.80 | 4.20 | 2.80 | 1.40 | 2.80 | 2.80 | 1.40 |
| N,N-DIMETHYL ETHANOLAMINE | 1C | 0.45 | 0.90 | 0.90 | 0.90 | 1.35 | 0.45 | 0.90 | 0.45 |
| TRIPHENYLPHOSPHINE | 1C | 2.65 | 2.65 | 3.97 | 2.65 | 2.65 | 1.32 | 2.65 | 2.65 |
| STRUKTOL ZB 47 | 1C | 1.5 | 1.5 | 1.5 | 1.5 | 1.5 | 1.5 | 1.5 | 1.5 |
| ZEOSIL 1165 MP | 1C | 25 | 25 | 25 | 25 | 25 | 25 | 25 | 25 |
| CALSOL 8240 | 1D | 22.5 | 22.5 | 22.5 | 22.5 | 22.5 | 22.5 | 22.5 | 22.5 |
| STEARIC ACID | 1D | 1.5 | 1.5 | 1.5 | 1.5 | 1.5 | 1.5 | 1.5 | 1.5 |
| SUNOLITE 160 PRILLS | 1D | 1.25 | 1.25 | 1.25 | 1.25 | 1.25 | 1.25 | 1.25 | 1.25 |
| ZEOSIL 1165 MP | 1D | 25 | 25 | 25 | 25 | 25 | 25 | 25 | 25 |
| VULKANOX ™ 4020 LG (6PPD) | 2A | 1.5 | 1.5 | 1.5 | 1.5 | 1.5 | 1.5 | 1.5 | 1.5 |
| VULKANOX ™ HS/LG | 2A | 1 | 1 | 1 | 1 | 1 | 1 | 1 | 1 |
| SPIDER SULPHUR | 3A | 1.5 | 1.5 | 1.5 | 1.5 | 1.5 | 1.5 | 1.5 | 1.5 |
| VULKACIT CZ/EGC | 3A | 1.75 | 1.75 | 1.75 | 1.75 | 1.75 | 1.75 | 1.75 | 1.75 |
| VULKACIT D/C (DPG) | 3A | 2 | 2 | 2 | 2 | 2 | 2 | 2 | 2 |
| ZINC OXIDE | 3A | 2.5 | 2.5 | 2.5 | 2.5 | 2.5 | 2.5 | 2.5 | 2.5 |

TABLE 1-continued

Formulations of Compounds 1-16.

| | Ingredients (phr) | | | | | | | |
|---|---|---|---|---|---|---|---|---|
| | 9 | 10 | 11 | 12 | 13 | 14 | 15 | 16 |
| BUNA ™ CB 25 | 30 | 30 | 30 | 30 | 30 | 30 | 30 | 30 |
| LANXESS ® BROMOBUTYL 2030 | 35 | 35 | 35 | 35 | 35 | 35 | 35 | 35 |
| NIPOL NS 116 R (SSBR) | 35 | 35 | 35 | 35 | 35 | 35 | 35 | 35 |
| ZEOSIL 1165 MP | 25 | 25 | 25 | 25 | 25 | 25 | 25 | 25 |
| CARBON BLACK, N 234 VULCAN 7H | 5 | 5 | 5 | 5 | 5 | 5 | 5 | 5 |
| SILANE SI-69 ® | 4.20 | 2.80 | 2.80 | 2.80 | 4.20 | 1.40 | 1.40 | 3.50 |
| N,N-DIMETHYL ETHANOLAMINE | 0.90 | 0.45 | 1.35 | 1.35 | 1.35 | 0.90 | 0.90 | 1.13 |
| TRIPHENYLPHOSPHINE | 1.32 | 3.97 | 1.32 | 3.97 | 2.65 | 1.32 | 3.97 | 2.00 |
| STRUKTOL ZB 47 | 1.5 | 1.5 | 1.5 | 1.5 | 1.5 | 1.5 | 1.5 | 1.5 |
| ZEOSIL 1165 MP | 25 | 25 | 25 | 25 | 25 | 25 | 25 | 25 |
| CALSOL 8240 | 22.5 | 22.5 | 22.5 | 22.5 | 22.5 | 22.5 | 22.5 | 22.5 |
| STEARIC ACID | 1.5 | 1.5 | 1.5 | 1.5 | 1.5 | 1.5 | 1.5 | 1.5 |
| SUNOLITE 160 PRILLS | 1.25 | 1.25 | 1.25 | 1.25 | 1.25 | 1.25 | 1.25 | 1.25 |
| ZEOSIL 1165 MP | 25 | 25 | 25 | 25 | 25 | 25 | 25 | 25 |
| VULKANOX ™ 4020 LG (6PPD) | 1.5 | 1.5 | 1.5 | 1.5 | 1.5 | 1.5 | 1.5 | 1.5 |
| VULKANOX ™ HS/LG | 1 | 1 | 1 | 1 | 1 | 1 | 1 | 1 |
| SPIDER SULPHUR | 1.5 | 1.5 | 1.5 | 1.5 | 1.5 | 1.5 | 1.5 | 1.5 |
| VULKACIT CZ/EGC | 1.75 | 1.75 | 1.75 | 1.75 | 1.75 | 1.75 | 1.75 | 1.75 |
| VULKACIT D/C (DPG) | 2 | 2 | 2 | 2 | 2 | 2 | 2 | 2 |
| ZINC OXIDE | 2.5 | 2.5 | 2.5 | 2.5 | 2.5 | 2.5 | 2.5 | 2.5 |

TABLE 2

Selected Physical and Dynamic Properties of Compounds 1-16

| | Example Compounds | | | | | | | |
|---|---|---|---|---|---|---|---|---|
| | 1 | 2 | 3 | 4 | 5 | 6 | 7 | 8 |
| Compound Mooney Viscosity: | | | | | | | | |
| ML 1 + 4 @ 100° C. | 66.4 | 64.3 | 63.9 | 63.6 | 81.4 | 69.8 | 65.5 | 90.8 |
| Compound Mooney Scorch: | | | | | | | | |
| MS LR @ 125° C., t05 (min) | >30 | 25.2 | 21.5 | 22.5 | 13.2 | >30 | 24.2 | 21.6 |
| MDR Cure Characteristics: 1.7 Hz, 1° arc, 160° C., 30 min, 100 dNm | | | | | | | | |
| MH (d · Nm) | 25.2 | 24.8 | 23.9 | 24.9 | 30.2 | 25.2 | 25.2 | 29.6 |
| ML (d · Nm) | 3.5 | 3.9 | 3.4 | 3.7 | 5.6 | 4.4 | 4.1 | 6.4 |
| ts2 | 3.03 | 2.22 | 2.31 | 2.04 | 1.05 | 3.15 | 2.10 | 1.29 |
| t90 (min) | 10.9 | 10.4 | 10.1 | 10.1 | 10.4 | 10.9 | 9.9 | 9.4 |
| Stress Strain (Dumbbells, t90 + 5) | | | | | | | | |
| Stress @ 100 (MPa) | 2.6 | 2.4 | 2.5 | 2.4 | 3.1 | 2.3 | 2.3 | 3.2 |
| Stress @ 300 (MPa) | 13.8 | 13.9 | 14.0 | 14.2 | | 12.0 | 14.4 | |
| Ultimate Tensile (MPa) | 14.6 | 15.0 | 15.3 | 16.0 | 15.3 | 15.6 | 15.6 | 13.9 |
| Ultimate Elongation (%) | 319 | 316 | 320 | 329 | 254 | 367 | 321 | 229 |
| Hardness Shore A2 (pts.) | 56 | 54 | 57 | 54 | 57 | 54 | 53 | 56 |
| DIN Abrasion (t90 + 10) | | | | | | | | |
| Abrasion Volume Loss (mm$^3$) | 135 | 121 | 125 | 130 | 105 | 129 | 114 | 101 |
| GABO (Dynamic Testing, t90 + 5) 10 Hz, 1% Static, 0.1% Dynamic Strain | | | | | | | | |
| E' @ −20° C. | 53.9 | 47.0 | 53.2 | 50.6 | 57.1 | 48.0 | 47.9 | 58.1 |
| tan δ @ −20° C. | 0.66 | 0.70 | 0.68 | 0.71 | 0.68 | 0.62 | 0.71 | 0.71 |
| E' @ 0° C. | 15.4 | 13.1 | 14.3 | 12.5 | 13.3 | 16.1 | 12.7 | 12.5 |
| tan δ @ 0° C. | 0.39 | 0.40 | 0.40 | 0.43 | 0.41 | 0.36 | 0.42 | 0.43 |
| E' @ +60° C. | 5.7 | 5.2 | 5.4 | 4.9 | 5.5 | 5.9 | 5.1 | 5.2 |
| tan δ @ +60° C. | 0.09 | 0.08 | 0.08 | 0.08 | 0.08 | 0.10 | 0.08 | 0.08 |

TABLE 2-continued

Selected Physical and Dynamic Properties of Compounds 1-16

| | Example Compounds | | | | | | | |
|---|---|---|---|---|---|---|---|---|
| | 9 | 10 | 11 | 12 | 13 | 14 | 15 | 16 |
| Compound Mooney Viscosity: | | | | | | | | |
| ML 1 + 4 @ 100° C. | 60.7 | 85.1 | 64.6 | 83.9 | 56.9 | 66.6 | 76.0 | 61.8 |
| Compound Mooney Scorch: | | | | | | | | |
| MS LR @ 125° C., t05 (min) | 28.1 | 14.6 | 24.0 | 10.2 | 19.1 | >30 | 12.4 | 23.2 |
| MDR Cure Characteristics: | | | | | | | | |
| 1.7 Hz, 1° arc, 160° C., 30 min, 100 dNm | | | | | | | | |
| MH (d · Nm) | 26.1 | 31.8 | 26.3 | 32.3 | 25.9 | 27.9 | 28.9 | 26.2 |
| ML (d · Nm) | 3.9 | 6.2 | 4.6 | 6.2 | 3.6 | 5.1 | 5.7 | 4.3 |
| ts2 | 2.61 | 1.05 | 2.16 | 1.05 | 2.16 | 1.44 | 0.99 | 2.28 |
| t90 (min) | 11.7 | 10.5 | 11.5 | 8.9 | 11.3 | 11.5 | 8.8 | 10.9 |
| Stress Strain (Dumbbells, t90 + 5) | | | | | | | | |
| Stress @ 100 (MPa) | 2.4 | 4.3 | 2.1 | 4.7 | 2.6 | 2.0 | 3.4 | 2.3 |
| Stress @ 300 (MPa) | 12.9 | | 12.7 | | 15.0 | 11.3 | | 13.7 |
| Ultimate Tensile (MPa) | 14.7 | 13.2 | 15.3 | 13.0 | 15.0 | 14.9 | 13.9 | 13.8 |
| Ultimate Elongation (%) | 335 | 193 | 327 | 178 | 309 | 361 | 225 | 302 |
| Hardness Shore A2 (pts.) | 57 | 58 | 55 | 59 | 57 | 56 | 57 | 55 |
| DIN Abrasion (t90 + 10) | | | | | | | | |
| Abrasion Volume Loss (mm$^3$) | 125 | 90 | 107 | 95 | 104 | 116 | 83 | 96 |
| GABO (Dynamic Testing, t90 + 5) | | | | | | | | |
| 10 Hz, 1% Static, 0.1% Dynamic Strain | | | | | | | | |
| E' @ −20° C. | 57.2 | 61.6 | 53.7 | 64.7 | 56.6 | 65.6 | 57.8 | 51.8 |
| tan δ @ −20° C. | 0.57 | 0.70 | 0.63 | 0.68 | 0.62 | 0.56 | 0.69 | 0.65 |
| E' @ 0° C. | 20.8 | 13.2 | 16.4 | 13.5 | 17.8 | 21.8 | 13.1 | 15.0 |
| tan δ @ 0° C. | 0.33 | 0.43 | 0.36 | 0.42 | 0.37 | 0.33 | 0.41 | 0.38 |
| E' @ +60° C. | 7.8 | 5.6 | 6.2 | 5.7 | 6.5 | 8.1 | 5.4 | 5.7 |
| tan δ @ +60° C. | 0.09 | 0.06 | 0.08 | 0.07 | 0.09 | 0.10 | 0.09 | 0.09 |

The tangent delta values measured at slightly higher temperatures (ie near 60° C.) for a compound can be a useful predictor for the rolling resistance of such compounds for tread applications. In general, at 60° C., the lower the tangent delta value, the smaller the predicted rolling resistance (and improved fuel economy). The tan delta values for examples 1-15 were within the range of 0.0633 to 0.1023 with the predictive model having a $R^2$ value of 0.6164, and the predicted value for example 16 was 0.0856 compared to the actual value of 0.0921.

FIG. 1 illustrates the stress/strain properties of selected compounds and compares high/medium/high loading and low/medium/low vs an intermediate (++−) loading.

These examples show clearly that all three different modifier classes are needed for a butyl based tread compound to obtain the desired balance of properties.

Examples 17-27 (Comparative Examples)

Examples 17-27 are comparative examples to show that any single modifier class does not result in a compound with the desired properties provided by a mixture of the three modifier classes. The data shows that the addition of Si69™, or DMAE or PPh$_3$ modifiers when used alone may improve specific properties of the bromobutyl based tread compound, but at the expense of significant deterioration in other properties. Only when a combination of all three modifiers (triblend) is used in the same zo compound does the best balance of properties result.

Figure 2A:
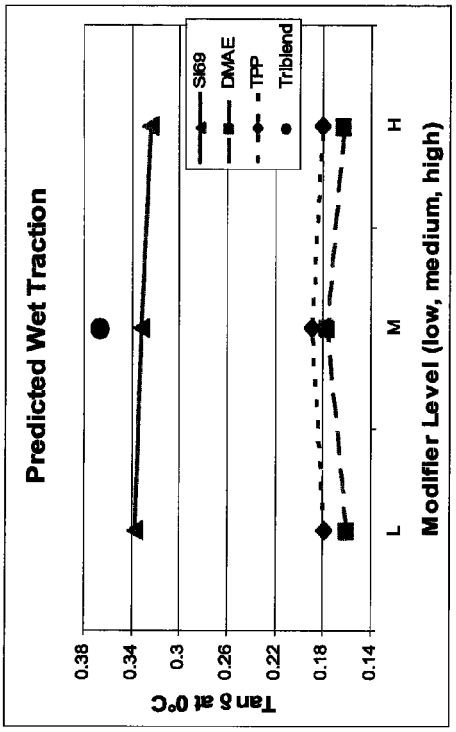
FIGS. 2a,b,c,d—illustrate the tan delta, at specific temperature, and physical property responses versus individual modifier level of filled butyl-SBR-BR elastomer compounds (17-27).
Figure 2B:
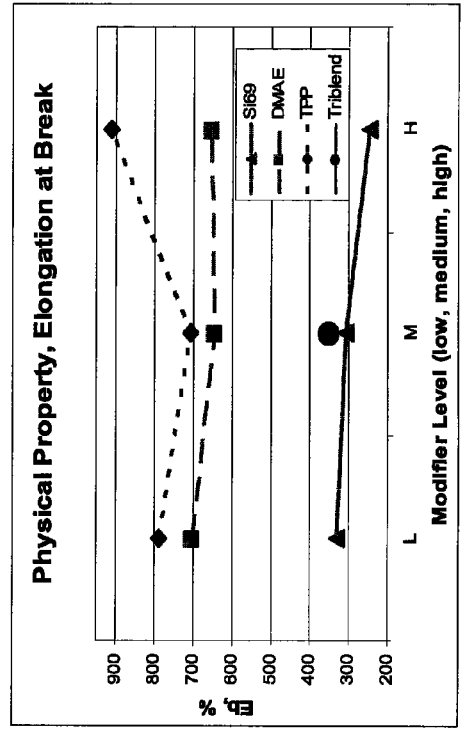
Figure 2C:
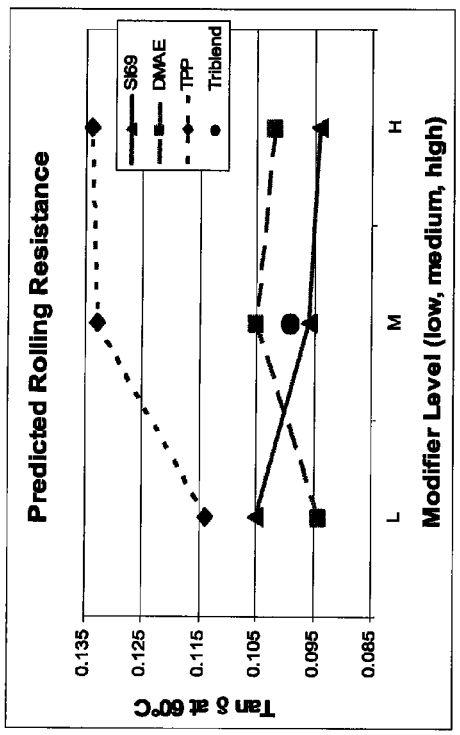
Figure 2D:
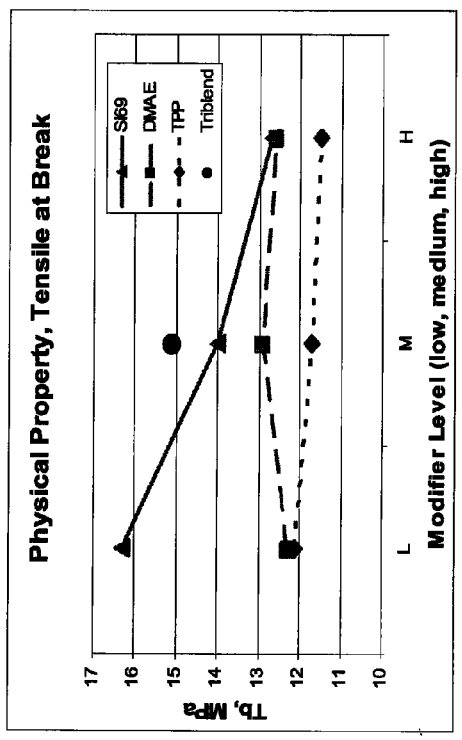

FIG. 2a,b,c,d illustrate the tan delta, tensile and elongation responses versus modifier loading of filled butyl-SBR-BR elastomer compounds (17-27, selected) and the triblend. FIG. 2b shows that the tan δ at 0° C. for the triblend gives better response (higher values predict improved wet traction properties) than any compound with any of the single modifiers used alone. Similarly, FIG. 2a shows that the tan δ at 60° C. for the triblend gives a desirably low value (small tan δ value at 60° C., predicts better rolling resistance for tires). Also, FIGS. 2c and 2d show that the triblend provides a desirable combination of high tensile strength elongation at break while maintaining the aforementioned tan δ values. The triblend clearly provides the best combination of properties when compared with any of the three modifiers when used alone, with balanced traction and rolling resistance properties as well as desirable physical properties.

Examples 28-34 (Comparative Examples)

Si69™ Added with Either DMAE or PPh$_3$ Modifier Classes

Figure 3A:
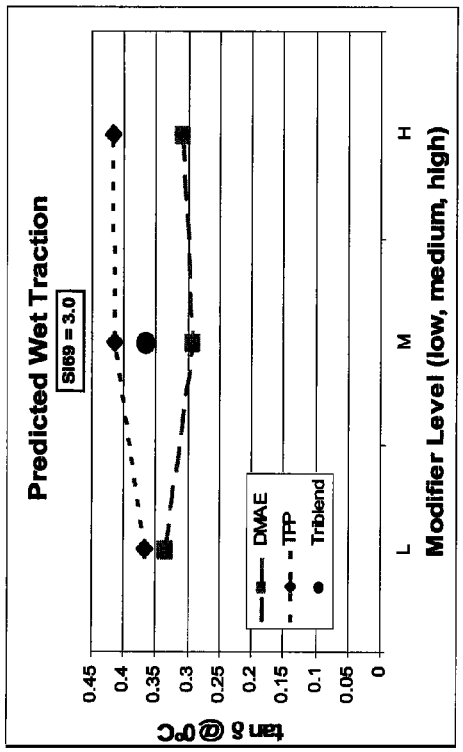
FIGS. 3a,b,c,d—illustrate the tan delta, at specific temperature, and physical property responses versus paired modifiers, at fixed silane level, of filled butyl-SBR-BR elastomer compounds (28-34).
Figure 3B:
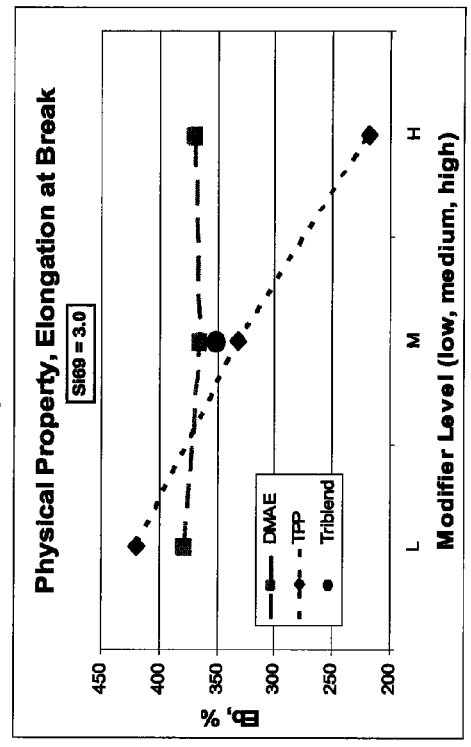
Figure 3C:
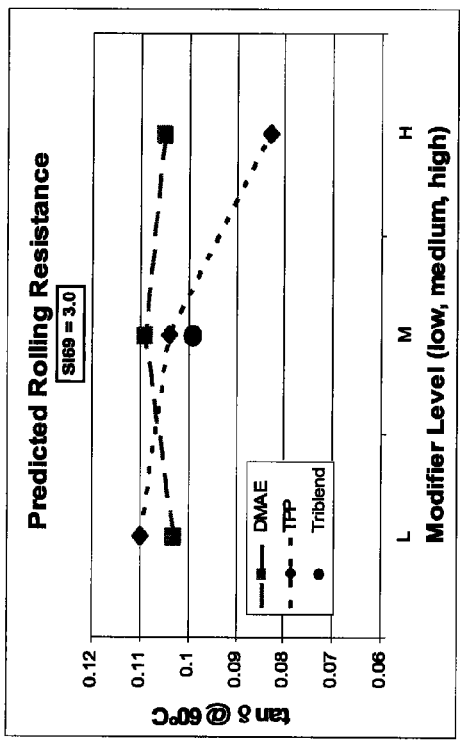
Figure 3D:
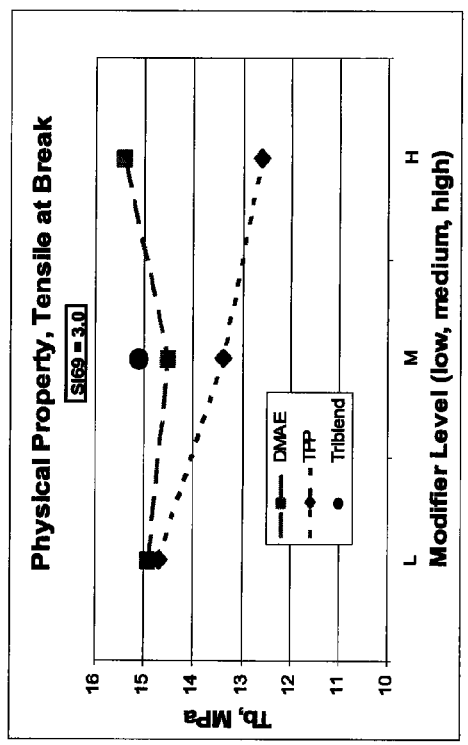

Compound formulations for examples 28-34 are listed in Table 5, and the corresponding physical properties are listed in Table 6. The examples show the formulations for combinations of two modifiers when silane is held constant, These examples are provided to illustrate the effects of a typical silane modifier, Si69™, added with either an aminoalcohol (DMAE) or a phosphine (PPh$_3$) in a two component mixed modifier system. FIG. 3a,b,c,d illustrate the effect of combinations of two modifiers on select properties. When the elongation at break for these compounds is in an acceptable range, the predicted rolling resistance values (tan δ at 60° C.) and the tensile strength are poorer than the rolling resistance and tensile responses obtained for the triblend. Similarly, the predicted wet traction is acceptable only at the expense of the tensile and elongation at break values. This is the case often found for compounds which have been over-cured to obtain improved rolling resistance at the expense of the other major properties required for superior tread compounds. The results show that no combination of Si69™ with any one of the other two modifiers results in comparable properties to the inventive three component system.

Examples 35-40 (Comparative Examples)

DMAE Added with Either Si6™ or PPh$_3$ Modifier Classes

Figure 4A:
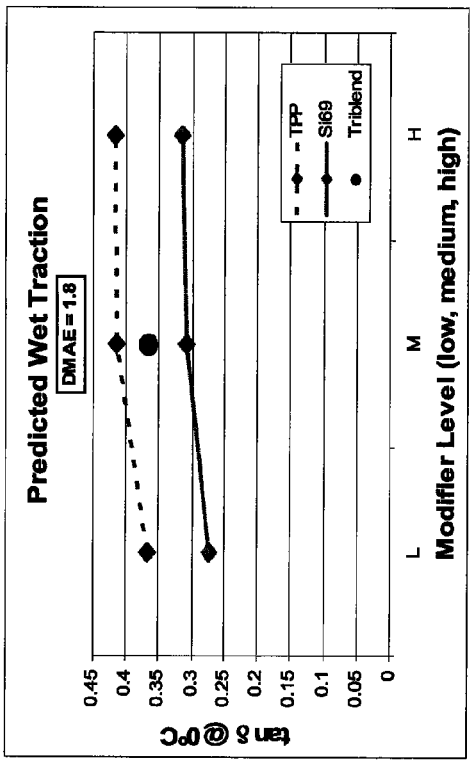
FIGS. 4a,b,c,d—illustrate the tan delta, at specific temperature, and physical property responses versus paired modifiers, at fixed N,N-dimethylaminoethanol (DMAE) level, of filled butyl-SBR-BR elastomer compounds (35-40).
Figure 4B:
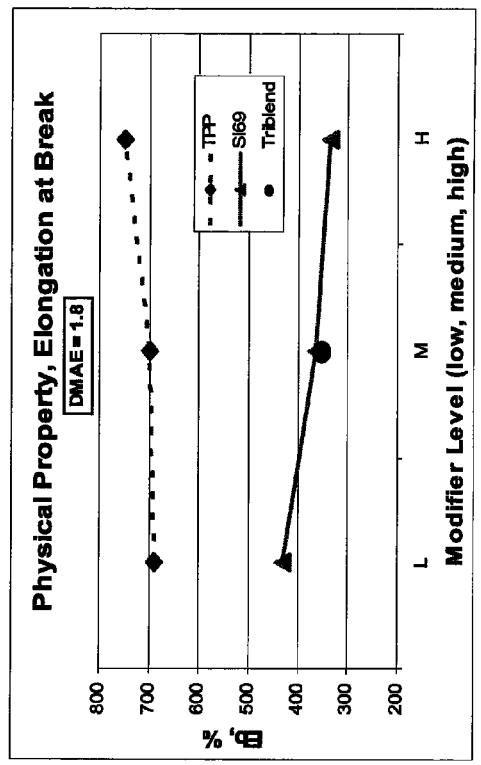
Figure 4C:
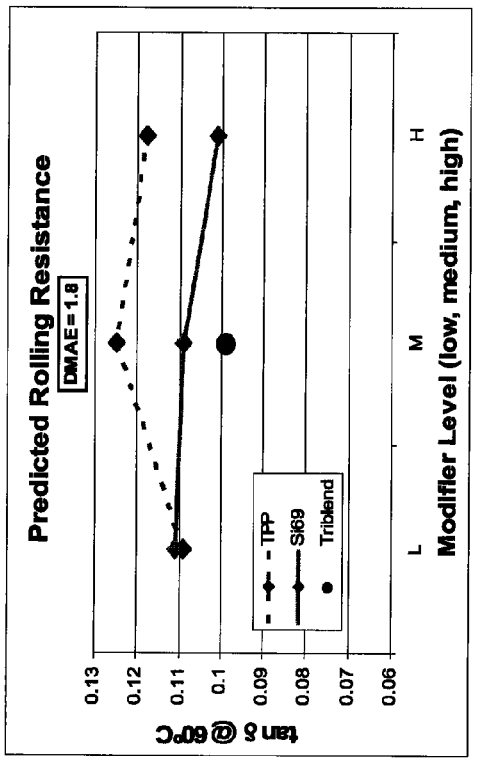
Figure 4D:
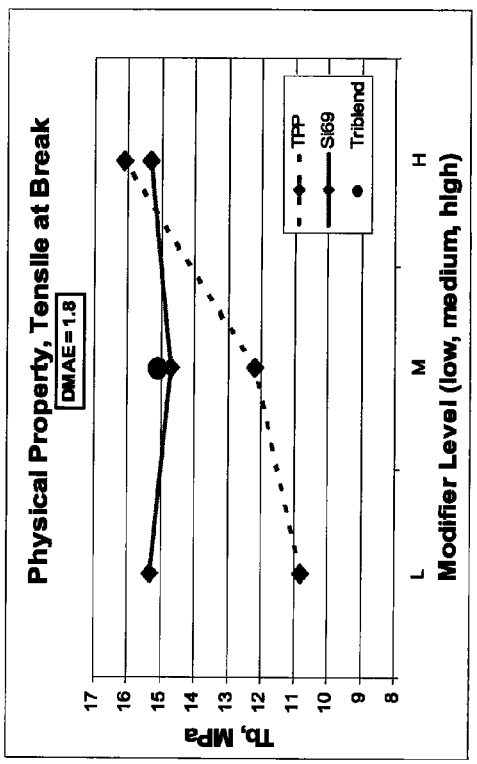

Compound formulations for examples 35-40 are listed in Table 7, and the corresponding physical properties are listed in Table 8. The examples show the formulations for combinations of two modifiers when DMAE is held constant. These examples are provided to illustrate the effects of an aminoalcohol modifier (DMAE) added with either a typical silane (Si69™) or a phosphine modifier (PPh$_3$) in a two component mixed modifier system. FIG. 4a,b,c,d illustrate the effect of the modifier combinations on select properties. The triblend provides the best predicted rolling resistance while simultaneously providing adequate wet traction, tensile and elongation at break properties. Once again, for comparison, the triblend mixture provides the best balance of properties for tread compounds. The results show that no combination of DMAE with either of the other modifiers results in comparable balance of properties to the inventive three component system.

Examples 41-46 (Comparative Examples)

PPh$_3$ with Added Si69™ or DMAE Modifier Classes

Figure 5B:
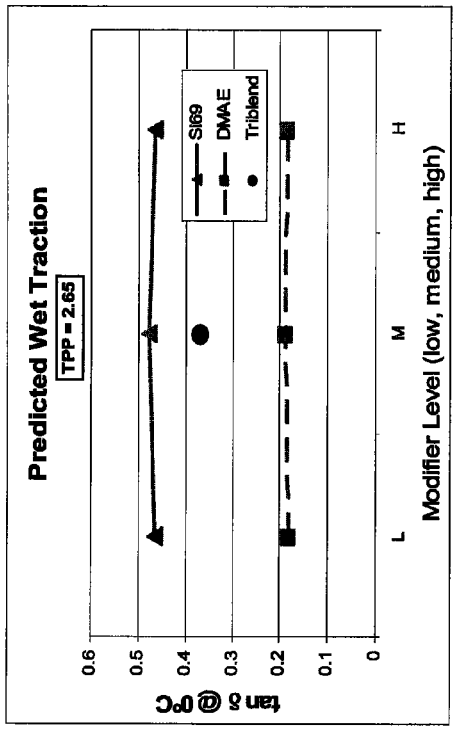
FIGS. 5a,b,c,d—illustrate the tan delta, at specific temperature, and physical property responses versus paired modifiers, at fixed triphenylphosphine (TPP) level, of filled butyl-SBR-BR elastomer compounds (41-46).
Figure 5D:
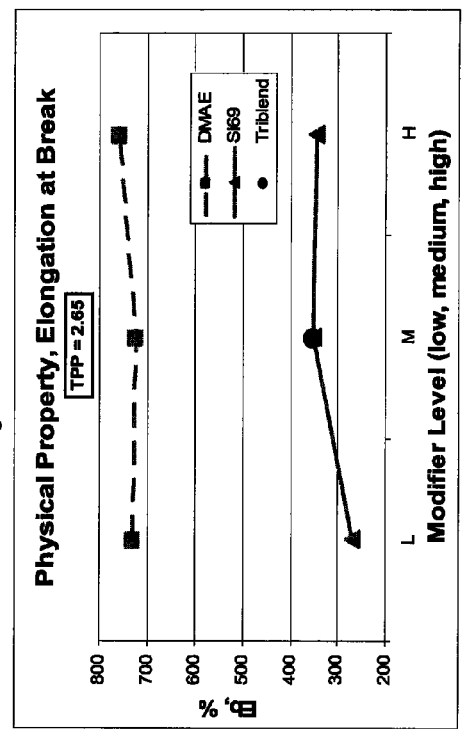
Figure 5A:
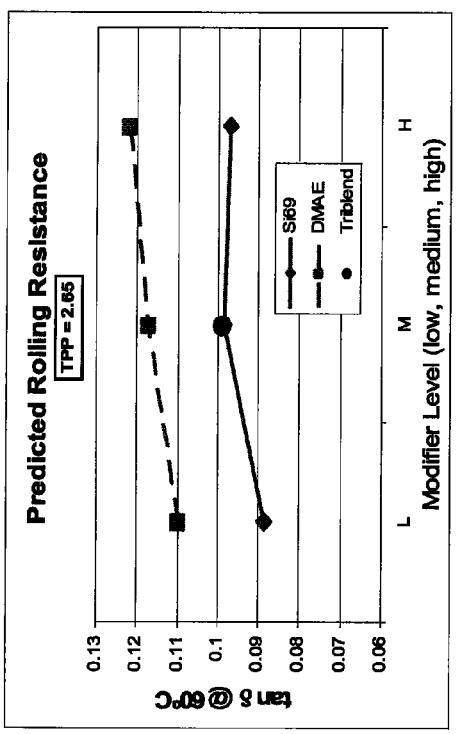
Figure 5C:
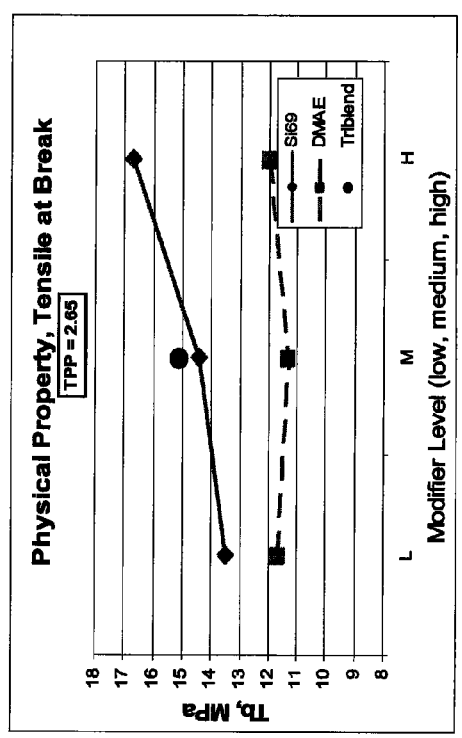
Figure 6:
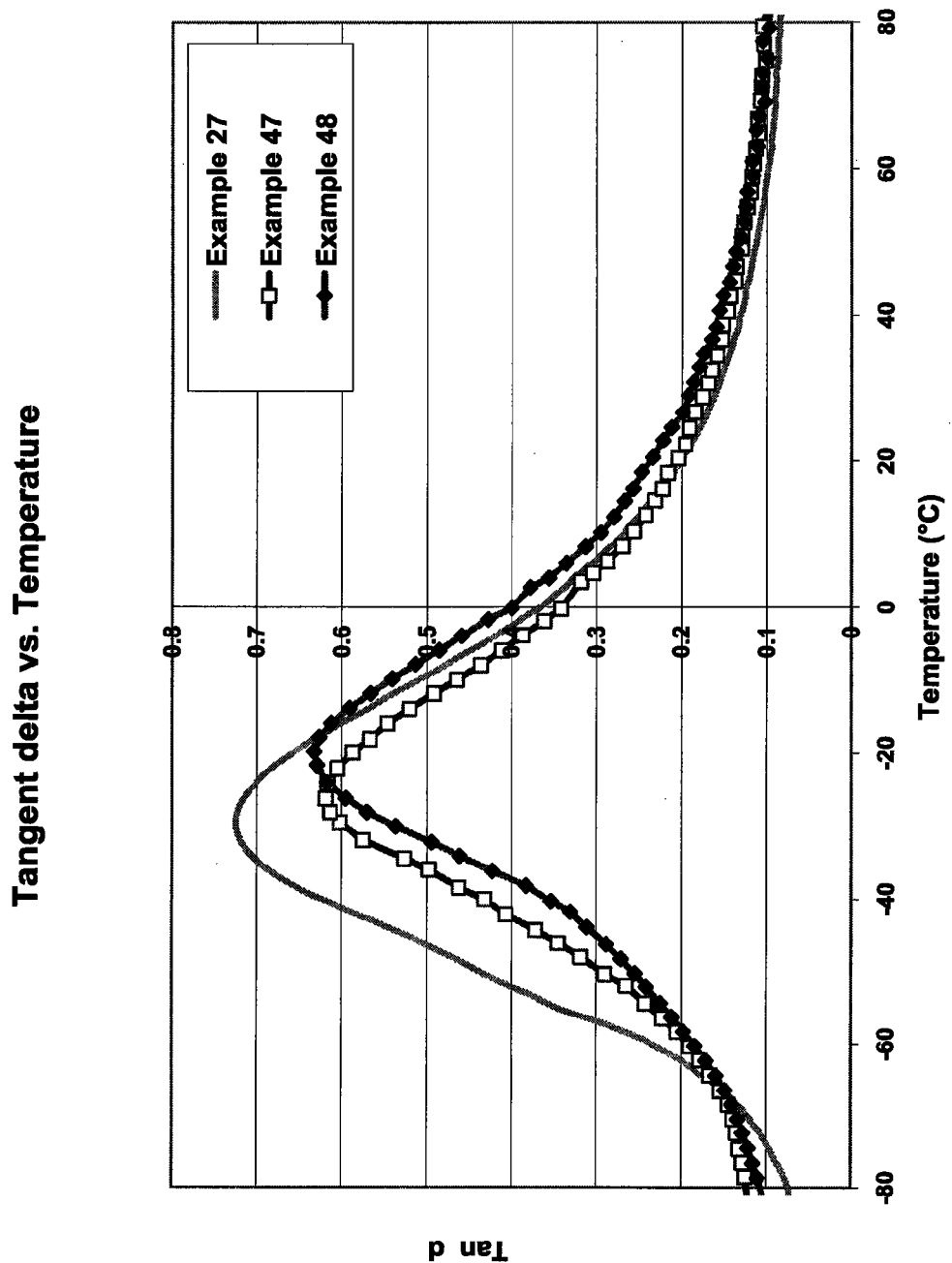
FIG. 6—illustrates the tan delta response versus temperature of filled butyl-SBR-BR elastomer compounds comprising a halobutyl terpolymer (47-48).

Compound formulations for examples 41-46 are listed in Table 9, and the corresponding physical properties are listed in Table 10. The examples show the formulations for combinations of two modifiers when TPP is held constant. These examples are provided to illustrate the effects of a phosphine modifier (PPh$_3$) added with either a typical silane (Si69™) or an aminoalcohol (DMAE) in a two component mixed modifier system. FIG. 5a,b,c,d illustrate the effect of the modifier combinations on select properties. When compared to the combination of TPP and DMAE, the triblend provides better tan δ as well as better physical properties. In comparing the triblend to the combination of TPP and Si69™ modifiers, the properties in FIGS. 5a,b,c,d are similar, however, the abrasion results for the dual modifier blend are poorer and, in some instances, the samples were too soft to test. The results show that no combination of PPh$_3$ with either of the other modifiers results in a balance of properties comparable to those of the inventive three component system.

These examples illustrate that, with either a one or a two component modifier system of the three classes of modifiers examined, the desired balance of properties in the resulting tread compounds cannot be met. Only with a combination of all three modifier classes can a superior butyl based tread compound with the desired combination of properties be attained.

Examples 47-48

Butyl Terpolymer in Tread Formulations

Butyl terpolymers were prepared by methods described by Kaszas in U.S. Pat. No. 6,960,632 and by Kaszas et al. in Rubber Chemistry and Technology, 2001 75, 155. The base polymers were brominated using standard methods (Br$_2$ in hexanes) to yield brominated butyl terpolymers. Two grades of brominated butyl terpolymers were generated with 5 and 8 mol % pMeSt:

| Materials | Residual 1,4 IP (mol %) | Allylic Bromide (mol %) | pMeSt (mol %) | Mooney (MU) |
|---|---|---|---|---|
| BB2030 | 0.4 | 0.8 | 0 | 32 |
| Terp 5 | 0.3 | 0.8 | 5 | 28 |
| Terp 8 | 0.3 | 0.8 | 8 | 30 |

Note that the amount of allylic bromide as measured by NMR microstructure analysis and residual 1,4 isoprene are similar to commercial grades of BB2030.

Formulations involving substitution of the BB2030 with the 5 mol % pMeSt butyl terpolymer (Terp 5, example 47) and the 8 mol % pMeSt butyl terpolymer (Terp 8, example 48) were performed to demonstrate the influence of the butyl based terpolymer on the various physical and dynamic tread properties of interest.

The compound viscosity (ML at 100° C.) for examples 47 and 48 were 49.3 and 50.9, which are slightly lower than that of compound 27 (55.2), the lower the values, the better for processing and handling of the compounds. The compound scorch time (MDR t05 at 125° C.) for examples 47 and 48 were 15.3 and 14.1 minutes, compared to 23.9 minutes for compound 27, the higher the values, the better for processing and handling of the compounds.

The compound elongation for examples 47 and 48 were 261 and 306%, compared to 351% for compound 27, with a minimum value of about 300% required for tread compounds, and the higher values in general the better. The compound abrasion (volume loss, using DIN method) is an important parameter for butyl based tread compounds. The abrasion loss for examples 47 and 48 were 137 and 135 mm$^3$, compared to 149 mm$^3$ for compound 27, with the lower the amount of abraded rubber being preferred for tread applications.

Table 12 shows the tan delta response of filled butyl-SBR-BR elastomer compounds of Examples 47 and 48 at select temperatures. The tangent delta values measured at relatively low temperatures (ie below 10° C.) for a compound can be a useful predictor for the traction properties for tread applications. In general, at 0° C., the higher the tangent delta value, the better the predicted wet traction. The tan delta values for examples 47 and 48 were 0.342 and 0.400, compared to 0.366 for compound 27, with the higher values being preferred for tread applications.

These examples demonstrate the current three modifier system can be successfully applied to other butyl based materials (butyl terpolymers in particular) to obtain a useful balance of properties relevant to tread applications. The resulting tread compounds in fact, have improved predicted traction properties while maintaining other abrasion and processing properties required for tread applications.

TABLE 3

Formulations of Compounds 17-27.

| | | Ingredients (phr) | | | | | | | | | | |
|---|---|---|---|---|---|---|---|---|---|---|---|---|
| | Tag | 17 | 18 | 19 | 20 | 21 | 22 | 23 | 24 | 25 | 26 | 27 |
| BUNA ™ CB 25 | 1A | 30 | 30 | 30 | 30 | 30 | 30 | 30 | 30 | 30 | 30 | 30 |
| LANXESS ® BROMOBUTYL 2030 | 1A | 35 | 35 | 35 | 35 | 35 | 35 | 35 | 35 | 35 | 35 | 35 |
| NIPOL NS 116 R (SSBR) | 1A | 35 | 35 | 35 | 35 | 35 | 35 | 35 | 35 | 35 | 35 | 35 |
| ZEOSIL 1165 MP | 1B | 25 | 25 | 25 | 25 | 25 | 25 | 25 | 25 | 25 | 25 | 25 |
| CARBON BLACK, N 234 VULCAN 7H | 1C | 5 | 5 | 5 | 5 | 5 | 5 | 5 | 5 | 5 | 5 | 5 |
| SILANE SI-69 ® | 1C | 0 | 6.0 | 3.5 | 8.5 | 0 | 0 | 0 | 0 | 0 | 0 | 3.5 |
| N,N-DIMETHYL ETHANOLAMINE | 1C | 0 | 0 | 0 | 0 | 3.6 | 2.2 | 5.0 | 0 | 0 | 0 | 1.13 |
| TRIPHENYLPHOSPHINE | 1C | 0 | 0 | 0 | 0 | 0 | 0 | 0 | 5.3 | 3.2 | 7.4 | 2.0 |
| STRUKTOL ZB 47 | 1C | 1.5 | 1.5 | 1.5 | 1.5 | 1.5 | 1.5 | 1.5 | 1.5 | 1.5 | 1.5 | 1.5 |
| ZEOSIL 1165 MP | 1C | 25 | 25 | 25 | 25 | 25 | 25 | 25 | 25 | 25 | 25 | 25 |
| CALSOL 8240 | 1D | 25 | 25 | 25 | 25 | 25 | 25 | 25 | 25 | 25 | 25 | 25 |
| STEARIC ACID | 1D | 1.5 | 1.5 | 1.5 | 1.5 | 1.5 | 1.5 | 1.5 | 1.5 | 1.5 | 1.5 | 1.5 |
| SUNOLITE 160 PRILLS | 1D | 1.25 | 1.25 | 1.25 | 1.25 | 1.25 | 1.25 | 1.25 | 1.25 | 1.25 | 1.25 | 1.25 |
| ZEOSIL 1165 MP | 1D | 25 | 25 | 25 | 25 | 25 | 25 | 25 | 25 | 25 | 25 | 25 |
| VULKANOX ™ 4020 LG (6PPD) | 2A | 1.5 | 1.5 | 1.5 | 1.5 | 1.5 | 1.5 | 1.5 | 1.5 | 1.5 | 1.5 | 1.5 |
| VULKANOX ™ HS/LG ( | 2A | 1 | 1 | 1 | 1 | 1 | 1 | 1 | 1 | 1 | 1 | 1 |
| SPIDER SULPHUR | 3A | 1.5 | 1.5 | 1.5 | 1.5 | 1.5 | 1.5 | 1.5 | 1.5 | 1.5 | 1.5 | 1.5 |
| VULKACIT CZ/EGC | 3A | 1.75 | 1.75 | 1.75 | 1.75 | 1.75 | 1.75 | 1.75 | 1.75 | 1.75 | 1.75 | 1.75 |
| VULKACIT D/C (DPG) | 3A | 2 | 2 | 2 | 2 | 2 | 2 | 2 | 2 | 2 | 2 | 2 |
| ZINC OXIDE | 3A | 2.5 | 2.5 | 2.5 | 2.5 | 2.5 | 2.5 | 2.5 | 2.5 | 2.5 | 2.5 | 2.5 |

TABLE 4

Selected Physical and Dynamic Properties of Compounds 17-27

| | Example Compounds | | | | | |
|---|---|---|---|---|---|---|
| | 17 | 18 | 19 | 20 | 21 | 22 |
| Compound Mooney Viscosity: | | | | | | |
| ML 1 + 4 @ 100° C. | 142.8 | 61.66 | 67.65 | 61.0 | 108.76 | 106.42 |
| Compound Mooney Scorch: | | | | | | |
| MS LR @ 125° C., t05 (min) | >30 | >30 | >30 | >30 | 22.3 | 24.5 |
| MDR Cure Characteristics: | | | | | | |
| 1.7 Hz, 1° arc, 160° C., 30 min, 100 dNm | | | | | | |
| MH (d · Nm) | 30.5 | 26.3 | 24.1 | 28.0 | 34.3 | 35.6 |
| ML (d · Nm) | 9.3 | 3.4 | 4.1 | 3.2 | 8.1 | 8.3 |
| t90 (min) | 18.2 | 11.7 | 11.5 | 13.6 | 15.8 | 17.2 |
| Stress Strain (Dumbells, t90 + 5) | | | | | | |
| Stress @ 100 (MPa) | 1.6 | 2.7 | 3.0 | 3.5 | 1.6 | 1.4 |
| Stress @ 300 (MPa) | 4.1 | 13.4 | 14.2 | — | 5.2 | 4.1 |
| Ultimate Tensile (MPa) | 11.5 | 14.0 | 16.3 | 12.7 | 12.9 | 12.3 |
| Ultimate Elongation (%) | 699 | 309 | 332 | 248 | 646 | 702 |
| Hardness Shore A2 (pts.) | 67.4 | 58.7 | 62.2 | 62.4 | 64.2 | 65 |
| DIN Abrasion (t90 + 10) | | | | | | |
| Abrasion Volume Loss (mm$^3$) | 318 | 133 | 256 | 128 | 226 | 136 |
| GABO (Dynamic Testing, t90 + 5) | | | | | | |
| 10 Hz, 1% Static, 0.1% Dynamic Strain | | | | | | |
| E' @ −20° C. | 109.05 | 44.06 | 39.91 | 50.99 | 99.34 | 102 |
| tan δ @ −20° C. | 0.3465 | .6196 | .6295 | .5957 | .3449 | .3186 |
| E' @ 0° C. | 62.385 | 17.23 | 15.55 | 20.35 | 56.95 | 61.41 |
| tan δ @ 0° C. | 0.1891 | .332 | .337 | .325 | .177 | .160 |
| E' @ +60° C. | 32.894 | 7.48 | 6.84 | 8.40 | 29.45 | 32.47 |
| tan δ @ +60° C. | 0.0774 | .096 | .105 | .094 | .105 | .094 |

TABLE 4-continued

Selected Physical and Dynamic Properties of Compounds 17-27

|  | Example Compounds | | | | |
|---|---|---|---|---|---|
|  | 23 | 24 | 25 | 26 | 27 |
| Compound Mooney Viscosity: | | | | | |
| ML 1 + 4 @ 100° C. | 109.75 | 189.9 | >200 | 172.2 | 55.2 |
| Compound Mooney Scorch: | | | | | |
| MS LR @ 125° C., t05 (min) | 20.7 | N/A | N/A | N/A | 23.9 |
| MDR Cure Characteristics: | | | | | |
| 1.7 Hz, 1° arc, 160° C., 30 min, 100 dNm | | | | | |
| MH (d · Nm) | 33.0 | 23.7 | 26.7 | 21.4 | 23.6 |
| ML (d · Nm) | 8.0 | 6.2 | 7.0 | 5.9 | 3.4 |
| t90 (min) | 14.4 | 6.4 | 7.9 | 4.8 | 10.2 |
| Stress Strain (Dumbells, t90 + 5) | | | | | |
| Stress @ 100 (MPa) | 1.6 | 1.5 | 1.6 | 1.5 | 2.3 |
| Stress @ 300 (MPa) | 5.1 | 4.0 | 4.6 | 3.6 | 12.4 |
| Ultimate Tensile (MPa) | 12.6 | 11.7 | 12.1 | 11.5 | 15.1 |
| Ultimate Elongation (%) | 652 | 790 | 707 | 911 | 351 |
| Hardness Shore A2 (pts.) | 62.5 | 63.4 | 64.9 | 63.5 | 54.2 |
| DIN Abrasion (t90 + 10) | | | | | |
| Abrasion Volume Loss (mm$^3$) | 218 | 280 | 284 | 274 | 149 |
| GABO (Dynamic Testing, t90 + 5) | | | | | |
| 10 Hz, 1% Static, 0.1% Dynamic Strain | | | | | |
| E' @ −20° C. | 94.93 | 94.43 | 97.2 | 109.5 | 43.29 |
| tan δ @ −20° C. | .3253 | .339 | .3256 | .3098 | .6598 |
| E' @ 0° C. | 56.65 | 53.27 | 56.13 | 63.65 | 14.48 |
| tan δ @ 0° C. | .163 | .189 | .179 | .181 | .366 |
| E' @ +60° C. | 29.24 | 22.35 | 26.50 | 26.02 | 5.92 |
| tan δ @ +60° C. | .102 | .133 | .114 | .134 | .099 |

TABLE 5

Formulations of Compounds 28-35.

|  |  | Ingredients (phr) | | | | | | | |
|---|---|---|---|---|---|---|---|---|---|
|  | Tag | 28 | 29 | 30 | 31 | 32 | 33 | 34 | 27 |
| BUNA ™ CB 25 | 1A | 30 | 30 | 30 | 30 | 30 | 30 | 30 | 30 |
| LANXESS ® BROMOBUTYL 2030 | 1A | 35 | 35 | 35 | 35 | 35 | 35 | 35 | 35 |
| NIPOL NS 116R (SSBR) | 1A | 35 | 35 | 35 | 35 | 35 | 35 | 35 | 35 |
| ZEOSIL 1165 MP | 1B | 25 | 25 | 25 | 25 | 25 | 25 | 25 | 25 |
| CARBON BLACK, N 234 VULCAN 7H | 1C | 5 | 5 | 5 | 5 | 5 | 5 | 5 | 5 |
| SILANE SI-69 ® | 1C | 0 | 3.0 | 3.0 | 3.0 | 3.0 | 3.0 | 3.0 | 3.5 |
| N,N-DIMETHYL ETHANOLAMINE | 1C | 0 | 1.8 | 1.1 | 2.5 | 0 | 0 | 0 | 1.13 |
| TRIPHENYLPHOSPHINE | 1C | 0 | 0 | 0 | 0 | 2.65 | 1.6 | 3.7 | 2.0 |
| STRUKTOL ZB 47 | 1C | 1.5 | 1.5 | 1.5 | 1.5 | 1.5 | 1.5 | 1.5 | 1.5 |
| ZEOSIL 1165 MP | 1C | 25 | 25 | 25 | 25 | 25 | 25 | 25 | 25 |
| CALSOL 8240 | 1D | 25 | 25 | 25 | 25 | 25 | 25 | 25 | 25 |
| STEARIC ACID | 1D | 1.5 | 1.5 | 1.5 | 1.5 | 1.5 | 1.5 | 1.5 | 1.5 |
| SUNOLITE 160 PRILLS | 1D | 1.25 | 1.25 | 1.25 | 1.25 | 1.25 | 1.25 | 1.25 | 1.25 |
| ZEOSIL 1165 MP | 1D | 25 | 25 | 25 | 25 | 25 | 25 | 25 | 25 |
| VULKANOX ™ 4020 LG (6PPD) | 2A | 1.5 | 1.5 | 1.5 | 1.5 | 1.5 | 1.5 | 1.5 | 1.5 |
| VULKANOX ™ HS/LG | 2A | 1 | 1 | 1 | 1 | 1 | 1 | 1 | 1 |
| SPIDER SULPHUR | 3A | 1.5 | 1.5 | 1.5 | 1.5 | 1.5 | 1.5 | 1.5 | 1.5 |
| VULKACIT CZ/EGC | 3A | 1.75 | 1.75 | 1.75 | 1.75 | 1.75 | 1.75 | 1.75 | 1.75 |
| VULKACIT D/C (DPG) | 3A | 2 | 2 | 2 | 2 | 2 | 2 | 2 | 2 |
| ZINC OXIDE | 3A | 2.5 | 2.5 | 2.5 | 2.5 | 2.5 | 2.5 | 2.5 | 2.5 |

TABLE 6

Selected Physical and Dynamic Properties of Compounds 28-35

| | Example Compounds | | | | | | | |
|---|---|---|---|---|---|---|---|---|
| | 28 | 29 | 30 | 31 | 32 | 33 | 34 | 27 |
| Compound Mooney Viscosity: | | | | | | | | |
| ML 1 + 4 @ 100° C. | 142.8 | 68.73 | 66.88 | 67.17 | 56.3 | 56.6 | 76.8 | 55.2 |
| Compound Mooney Scorch: | | | | | | | | |
| MS LR @ 125° C., t05 (min) | >30 | 18.5 | 26.9 | 15.4 | >30 | >30 | 28.4 | 23.9 |
| MDR Cure Characteristics: | | | | | | | | |
| 1.7 Hz, 1° arc, 160° C., 30 min, 100 dNm | | | | | | | | |
| MH (d · Nm) | 30.5 | 27.3 | 25.6 | 27.1 | 23.2 | 22.0 | 28.6 | 23.6 |
| ML (d · Nm) | 9.3 | 4.7 | 4.4 | 4.9 | 3.9 | 3.6 | 6.3 | 3.4 |
| t90 (min) | 18.2 | 12.0 | 11.2 | 11.2 | 10.0 | 11.6 | 9.6 | 10.2 |
| Stress Strain (Dumbells, t90 + 5) | | | | | | | | |
| Stress @ 100 (MPa) | 1.5 | 2.2 | 2.1 | 2.2 | 1.9 | 1.8 | 3.3 | 2.3 |
| Stress @ 300 (MPa) | 3.9 | 11.2 | 10.9 | 11.7 | 11.2 | 9.4 | — | 12.4 |
| Ultimate Tensile (MPa) | 8.6 | 14.5 | 14.9 | 15.4 | 13.4 | 14.7 | 12.6 | 15.1 |
| Ultimate Elongation (%) | 573 | 366 | 378 | 369 | 332 | 420 | 218 | 351 |
| Hardness Shore A2 (pts.) | 68 | 57.5 | 54.7 | 56.2 | 52 | 51.0 | 57.2 | 54.2 |
| DIN Abrasion (t90 + 10) | | | | | | | | |
| Abrasion Volume Loss (mm$^3$) | 363 | 128 | 132 | 126 | 164 | 186 | 125 | 149 |
| GABO (Dynamic Testing, t90 + 5) | | | | | | | | |
| 10 Hz, 1% Static, 0.1% Dynamic Strain | | | | | | | | |
| E' @ −20° C. | 109.5 | 52.8 | 42.3 | 48.3 | 40.9 | 39.6 | 50.5 | 43.29 |
| tan δ @ −20° C. | 0.3465 | .5375 | .6163 | .5836 | .7362 | .6549 | .7259 | .6598 |
| E' @ 0° C. | 62.4 | 22.1 | 16.2 | 19.0 | 12.0 | 14.0 | 12.1 | 14.48 |
| tan δ @ 0° C. | 0.1891 | .292 | .334 | .309 | .415 | .367 | .416 | .366 |
| E' @ +60° C. | 32.9 | 9.6 | 6.8 | 8.1 | 4.9 | 5.6 | 5.2 | 5.92 |
| tan δ @ +60° C. | 0.0774 | 0.109 | 0.103 | 0.105 | 0.104 | 0.110 | 0.083 | .099 |

TABLE 7

Formulations of Compounds 35-40.

| | | Ingredients (phr) | | | | | | |
|---|---|---|---|---|---|---|---|---|
| | Tag | 35 | 36 | 37 | 38 | 39 | 40 | 27 |
| BUNA ™ CB 25 | 1A | 30 | 30 | 30 | 30 | 30 | 30 | 30 |
| LANXESS ® BROMOBUTYL 2030 | 1A | 35 | 35 | 35 | 35 | 35 | 35 | 35 |
| NIPOL NS 116 R (SSBR) | 1A | 35 | 35 | 35 | 35 | 35 | 35 | 35 |
| ZEOSIL 1165 MP | 1B | 25 | 25 | 25 | 25 | 25 | 25 | 25 |
| CARBON BLACK, N 234 VULCAN 7H | 1C | 5 | 5 | 5 | 5 | 5 | 5 | 5 |
| SILANE SI-69 ® | 1C | 3.0 | 1.75 | 4.25 | 0 | 0 | 0 | 3.5 |
| N,N-DIMETHYL ETHANOLAMINE | 1C | 1.8 | 1.8 | 1.8 | 1.8 | 1.8 | 1.8 | 1.13 |
| TRIPHENYLPHOSPHINE | 1C | 0 | 0 | 0 | 2.65 | 1.6 | 3.7 | 2.0 |
| STRUKTOL ZB 47 | 1C | 1.5 | 1.5 | 1.5 | 1.5 | 1.5 | 1.5 | 1.5 |
| ZEOSIL 1165 MP | 1C | 25 | 25 | 25 | 25 | 25 | 25 | 25 |
| CALSOL 8240 | 1D | 25 | 25 | 25 | 25 | 25 | 25 | 25 |
| STEARIC ACID | 1D | 1.5 | 1.5 | 1.5 | 1.5 | 1.5 | 1.5 | 1.5 |
| SUNOLITE 160 PRILLS | 1D | 1.25 | 1.25 | 1.25 | 1.25 | 1.25 | 1.25 | 1.25 |
| ZEOSIL 1165 MP | 1D | 25 | 25 | 25 | 25 | 25 | 25 | 25 |
| VULKANOX ™ 4020 LG (6PPD) | 2A | 1.5 | 1.5 | 1.5 | 1.5 | 1.5 | 1.5 | 1.5 |
| VULKANOX ™ HS/LG | 2A | 1 | 1 | 1 | 1 | 1 | 1 | 1 |
| SPIDER SULPHUR | 3A | 1.5 | 1.5 | 1.5 | 1.5 | 1.5 | 1.5 | 1.5 |
| VULKACIT CZ/EGC | 3A | 1.75 | 1.75 | 1.75 | 1.75 | 1.75 | 1.75 | 1.75 |
| VULKACIT D/C (DPG) | 3A | 2 | 2 | 2 | 2 | 2 | 2 | 2 |
| ZINC OXIDE | 3A | 2.5 | 2.5 | 2.5 | 2.5 | 2.5 | 2.5 | 2.5 |

TABLE 8

Selected Physical and Dynamic Properties of Compounds 35-40

| | Example Compounds | | | | | | |
|---|---|---|---|---|---|---|---|
| | 35 | 36 | 37 | 38 | 39 | 40 | 27 |
| Compound Mooney Viscosity: | | | | | | | |
| ML 1 + 4 @ 100° C. | 67.29 | 67.32 | 67.74 | 93.02 | 97.52 | 116.84 | 55.2 |
| Compound Mooney Scorch: | | | | | | | |
| MS LR @ 125° C., t05 (min) | 18.7 | 21.7 | 15.8 | 7.1 | 7.8 | 4.5 | 23.9 |
| MDR Cure Characteristics: | | | | | | | |
| 1.7 Hz, 1° arc, 160° C., 30 min, 100 dNm | | | | | | | |
| MH (d · Nm) | 27.3 | 27.8 | 27.1 | 31.4 | 34.6 | 29.3 | 23.6 |
| ML (d · Nm) | 4.8 | 5.3 | 4.4 | 7.2 | 8.0 | 7.2 | 3.4 |
| t90 (min) | 11.6 | 13.0 | 10.5 | 16.3 | 17.4 | 15.8 | 10.2 |
| Stress Strain (Dumbells, t90 + 5) | | | | | | | |
| Stress @ 100 (MPa) | 2.5 | 1.8 | 2.5 | 1.6 | 1.6 | 1.4 | 2.3 |
| Stress @ 300 (MPa) | 12.4 | 9.4 | 13.2 | 4.6 | 4.6 | 3.7 | 12.4 |
| Ultimate Tensile (MPa) | 15.8 | 15.3 | 15.3 | 12.4 | 12.2 | 10.8 | 15.1 |
| Ultimate Elongation (%) | 365 | 431 | 337 | 699 | 689 | 749 | 351 |
| Hardness Shore A2 (pts.) | 60 | 56.3 | 57.3 | 63.1 | 63.3 | 63.3 | 54.2 |
| DIN Abrasion (t90 + 10) | | | | | | | |
| Abrasion Volume Loss (mm$^3$) | 132 | 142 | 129 | 270 | 304 | 360 | 149 |
| GABO (Dynamic Testing, t90 + 5) | | | | | | | |
| 10 Hz, 1% Static, 0.1% Dynamic Strain | | | | | | | |
| E' @ −20° C. | 50.27 | 52.25 | 47.09 | 106.9 | 110.3 | 115.4 | 43.29 |
| tan δ @ −20° C. | .5672 | .5142 | .5860 | .3472 | .3242 | .3216 | 0.6598 |
| E' @ 0° C. | 20.28 | 22.2 | 18.8 | 57.91 | 63.71 | 65.67 | 14.48 |
| tan δ @ 0° C. | .308 | .274 | .316 | .204 | .177 | .190 | 0.366 |
| E' @ +60° C. | 8.53 | 9.73 | 8.03 | 24.51 | 29.67 | 29.02 | 5.92 |
| tan δ @ +60° C. | .109 | .111 | .101 | .125 | .109 | .118 | 0.099 |

TABLE 9

Formulations of Compounds 41-46.

| | | Ingredients (phr) | | | | | | |
|---|---|---|---|---|---|---|---|---|
| | Tag | 41 | 42 | 43 | 44 | 45 | 46 | 27 |
| BUNA ™ CB 25 | 1A | 30 | 30 | 30 | 30 | 30 | 30 | 30 |
| LANXESS ® BROMOBUTYL 2030 | 1A | 35 | 35 | 35 | 35 | 35 | 35 | 35 |
| NIPOL NS 116 R (SSBR) | 1A | 35 | 35 | 35 | 35 | 35 | 35 | 35 |
| ZEOSIL 1165 MP | 1B | 25 | 25 | 25 | 25 | 25 | 25 | 25 |
| CARBON BLACK, N 234 VULCAN 7H | 1C | 5 | 5 | 5 | 5 | 5 | 5 | 5 |
| SILANE SI-69 ® | 1C | 3.0 | 1.75 | 4.25 | 0 | 0 | 0 | 3.5 |
| N,N-DIMETHYL ETHANOLAMINE | 1C | 0 | 0 | 0 | 1.8 | 1.1 | 2.5 | 1.13 |
| TRIPHENYLPHOSPHINE | 1C | 2.65 | 2.65 | 2.65 | 2.65 | 2.65 | 2.65 | 2.0 |
| STRUKTOL ZB 47 | 1C | 1.5 | 1.5 | 1.5 | 1.5 | 1.5 | 1.5 | 1.5 |
| ZEOSIL 1165 MP | 1C | 25 | 25 | 25 | 25 | 25 | 25 | 25 |
| CALSOL 8240 | 1D | 25 | 25 | 25 | 25 | 25 | 25 | 25 |
| STEARIC ACID | 1D | 1.5 | 1.5 | 1.5 | 1.5 | 1.5 | 1.5 | 1.5 |
| SUNOLITE 160 PRILLS | 1D | 1.25 | 1.25 | 1.25 | 1.25 | 1.25 | 1.25 | 1.25 |
| ZEOSIL 1165 MP | 1D | 25 | 25 | 25 | 25 | 25 | 25 | 25 |
| VULKANOX ™ 4020 LG (6PPD) | 2A | 1.5 | 1.5 | 1.5 | 1.5 | 1.5 | 1.5 | 1.5 |
| VULKANOX ™ HS/LG | 2A | 1 | 1 | 1 | 1 | 1 | 1 | 1 |
| SPIDER SULPHUR | 3A | 1.5 | 1.5 | 1.5 | 1.5 | 1.5 | 1.5 | 1.5 |
| VULKACIT CZ/EGC | 3A | 1.75 | 1.75 | 1.75 | 1.75 | 1.75 | 1.75 | 1.75 |
| VULKACIT D/C (DPG) | 3A | 2 | 2 | 2 | 2 | 2 | 2 | 2 |
| ZINC OXIDE | 3A | 2.5 | 2.5 | 2.5 | 2.5 | 2.5 | 2.5 | 2.5 |

TABLE 10

Selected Physical and Dynamic Properties of Compounds 41-46

| | Example Compounds | | | | | | |
|---|---|---|---|---|---|---|---|
| | 41 | 42 | 43 | 44 | 45 | 46 | 27 |
| Compound Mooney Viscosity: | | | | | | | |
| ML 1 + 4 @ 100° C. | 56.33 | 76.45 | 55.59 | 99.93 | 104.89 | 96.87 | 55.2 |
| Compound Mooney Scorch: | | | | | | | |
| MS LR @ 125° C., t05 (min) | >30 | >30 | >30 | 6.5 | 7.3 | 6.2 | 23.9 |
| MDR Cure Characteristics: 1.7 Hz, 1° arc, 160° C., 30 min, 100 dNm | | | | | | | |
| MH (d · Nm) | 20.6 | 25.6 | 21.9 | 30.9 | 28.3 | 31.8 | 23.6 |
| ML (d · Nm) | 3.2 | 5.4 | 3.3 | 7.2 | 6.8 | 7.5 | 3.4 |
| t90 (min) | 9.3 | 8.4 | 9.9 | 16.0 | 16.0 | 16.1 | 10.2 |
| Stress Strain (Dumbells, t90 + 5) | | | | | | | |
| Stress @ 100 (MPa) | 1.9 | 2.8 | 2.1 | 1.5 | 1.3 | 1.4 | 2.3 |
| Stress @ 300 (MPa) | 11.9 | — | 12.2 | 4.1 | 3.7 | 3.8 | 12.4 |
| Ultimate Tensile (MPa) | 14.6 | 15.0 | 14.8 | 11.3 | 11.7 | 12.0 | 15.1 |
| Ultimate Elongation (%) | 353 | 269 | 346 | 72.3 | 73.2 | 759 | 351 |
| Hardness Shore A2 (pts.) | 50 | 55 | 51.6 | 65.7 | 61.4 | 63.6 | 54.2 |
| DIN Abrasion (t90 + 10) | | | | | | | |
| Abrasion Volume Loss (mm$^3$) | soft | 144 | soft | 322 | 341 | 324 | 149 |
| GABO (Dynamic Testing, t90 + 5) 10 Hz, 1% Static, 0.1% Dynamic Strain | | | | | | | |
| E' @ −20° C. | 40.92 | 52.42 | 43.64 | 106.2 | 106.8 | 111.1 | 43.29 |
| tan δ @ −20° C. | 0.7963 | 0.7452 | 0.7796 | .3344 | .3217 | .326 | .6598 |
| E' @ 0° C. | 11.788 | 12.087 | 12.908 | 59.11 | 62.25 | 64.03 | 14.48 |
| tan δ @ 0° C. | 0.4782 | 0.4358 | 0.4634 | .189 | .181 | .186 | 0.366 |
| E' @ +60° C. | 4.4096 | 4.8861 | 4.8721 | 25.71 | 28.74 | 28.25 | 5.92 |
| tan δ @ +60° C. | 0.0984 | 0.0887 | 0.0969 | .117 | .110 | .122 | 0.099 |

TABLE 11

Formulations of Compounds 47-48.

| | | Example Compounds | | |
|---|---|---|---|---|
| | | 27 | 47 | 48 |
| BUNA CB25 | 1A | 30 | 30 | 30 |
| LANXESS BROMOBUTYL 2030 | 1A | 35 | | |
| MB TERP5 | 1A | | 35 | |
| MB TERP 10 | 1A | | | 35 |
| NIPOL NS 116 R (SSBR) | 1A | 35 | 35 | 35 |
| TRIPHENYLPHOSPHINE | 1B | 2 | 2 | 2 |
| ZEOSIL 1165 MP | 1B | 25 | 25 | 25 |
| CARBON BLACK, N 234 VULCAN 7H | 1C | 5 | 5 | 5 |
| N,N-DIMETHYLETHANOLAMINE | 1C | 1.13 | 1.13 | 1.13 |
| SILANE SI-69 | 1C | 3.5 | 3.5 | 3.5 |
| ZEOSIL 1165 MP | 1C | 25 | 25 | 25 |
| CALSOL 8240 | 1D | 25 | 25 | 25 |
| STEARIC ACID | 1D | 1.5 | 1.5 | 1.5 |
| STRUKTOL JV 46F | 1D | 1.5 | 1.5 | 1.5 |
| SUNOLITE 160 PRILLS | 1D | 1.25 | 1.25 | 1.25 |
| ZEOSIL 1165 MP | 1D | 25 | 25 | 25 |
| VULKANOX 4020 LG (6PPD) | 2A | 1.5 | 1.5 | 1.5 |
| VULKANOX HS/LG | 2A | 1 | 1 | 1 |
| SPIDER SULPHUR | 3A | 1.5 | 1.5 | 1.5 |
| VULKACIT CZ/EGC | 3A | 1.75 | 1.75 | 1.75 |
| VULKACIT D/C (DPG) | 3A | 2 | 2 | 2 |
| ZINC OXIDE | 3A | 2.5 | 2.5 | 2.5 |

TABLE 12

Selected Physical and Dynamic Properties of Compounds 47-48

| | Example Compounds | | |
|---|---|---|---|
| | 27 | 47 | 48 |
| Compound Mooney Viscosity: | | | |
| ML 1 + 4 @ 100° C. | 55.2 | 49.3 | 50.9 |
| Compound Mooney Scorch: | | | |
| MS LR @ 125° C., t05 (min) | 23.9 | 15.3 | 14.1 |
| MDR Cure Characteristics: 1.7 Hz, 1° arc, 160° C., 30 min, 100 dNm | | | |
| MH (d · Nm) | 23.6 | 26.8 | 28.7 |
| ML (d · Nm) | 3.4 | 3.1 | 3.2 |
| t90 (min) | 10.2 | 10.7 | 12.1 |
| Stress Strain (Dumbells, t90 + 5) | | | |
| Stress @ 100 (MPa) | 2.3 | 3.0 | 2.9 |
| Stress @ 300 (MPa) | 12.4 | — | 15.1 |
| Ultimate Tensile (MPa) | 15.1 | 12.1 | 15.4 |
| Ultimate Elongation (%) | 351 | 261 | 306 |
| Hardness Shore A2 (pts.) | 54.2 | 62.7 | 60.1 |
| DIN Abrasion (t90 + 10) | | | |
| Abrasion Volume Loss (mm$^3$) | 149 | 137 | 135 |
| GABO (Dynamic Testing, t90 + 5) 10 Hz, 1% Static, 0.1% Dynamic Strain | | | |
| E' @ −20° C. | 43.29 | 105.09 | 140.36 |
| tan δ @ −20° C. | 0.6598 | 0.587 | 0.632 |
| E' @ 0° C. | 14.48 | 35.51 | 34.015 |
| tan δ @ 0° C. | 0.366 | 0.342 | 0.400 |

TABLE 12-continued

Selected Physical and Dynamic Properties of Compounds 47-48

| | Example Compounds | | |
|---|---|---|---|
| | 27 | 47 | 48 |
| E' @ +60° C. | 5.92 | 11.89 | 11.46 |
| tan δ @ +60° C. | 0.099 | 0.116 | 0.117 |

What is claimed is:

1. A rubber compound comprising a halobutyl elastomer, at least one additional elastomer, a mineral filler, and an at least three component mixed modifier system comprising a silane, a phosphine, and an additive comprising at least one hydroxyl group and a functional group comprising a basic amine.

2. The rubber compound according to claim 1, wherein the halobutyl elastomer comprises a halogenated copolymer of at least an isoolefin and a conjugated diolefin.

3. The rubber compound according to claim 2, wherein the isoolefin comprises isobutylene and wherein the conjugated diolefin comprises isoprene.

4. The rubber compound according to claim 1, wherein the halobutyl elastomer comprises a halogenated terpolymer of an isoolefin, a conjugated diolefin, and a vinyl aromatic monomer.

5. The rubber compound according to claim 4, wherein the isoolefin comprises isobutylene, the conjugated diene comprises isoprene and the vinyl aromatic monomer comprises p-methylstyrene.

6. The rubber compound according to claim 1, wherein the additional elastomer comprises BR, SBR, NBR, NR, ENR or mixtures thereof.

7. The rubber compound according to claim 1, wherein the mineral filler comprises silica.

8. The rubber compound according to claim 1, wherein the silane comprises an aminosilane or a sulphur-containing silane.

9. The rubber compound according to claim 8, wherein the silane comprises bis[3-(triethoxysilyl)propyl]-monosulfane, bis[3(triethoxysilyl)propyl]disulfane, bis[3-(triethoxysilyl)propyl]trisulfane, bis[3(triethoxysilyl)propyl]tetrasulfane, bis[2-(triethoxysilyl)ethyl]-tetrasulfane, 3-(triethoxysilyl)propanthiol, or a mixture thereof.

10. The rubber compound according to claim 1, wherein the phosphine comprises trimethylphosphine, triethylphosphine, triisopropylphosphine, tri-n-butylphosphine, triphenylphosphine, or a mixture thereof.

11. The rubber compound according to claim 1, wherein the additive comprising at least one hydroxyl group and a functional group containing a basic amine comprises an aminoalcohol.

12. The rubber compound according to claim 11, wherein the aminoalcohol comprises mono ethanol amine (MEA), N,N-dimethylaminoethanol (DMAE), diethanolamine (DEA), dibutyl-aminoethanol (DBAE), methyldiethanolamine (MDEA), phenyldiethanolamine (PDEA), or a mixture thereof.

13. The rubber compound according to claim 1, wherein the phosphine is present in the range of 0.1 to 6.0 phr.

14. The rubber compound according to claim 1, wherein the additive comprising at least one hydroxyl group and a functional group containing a basic amine is present in the range of 0.1 to 6.0 phr.

15. The rubber compound according to claim 1, wherein the silane is present in the range of 0.1 to 15.0 phr.

16. The rubber compound according to claim 1, wherein the phosphine comprises triphenylphosphine and is present in the range of 0.1 to 6.0 phr, wherein the additive comprising at least one hydroxyl group and a functional group containing a basic amine comprises N,N-dimethylaminoethanol and is present in the range of 0.1 to 6.0 phr and wherein the silane comprises bis[3(triethoxysilyl)propyl]tetrasulfane and is present in the range of 0.1 to 15.0 phr.

17. The rubber compound according to claim 1, wherein the tan delta at 0° C. is greater than 0.325, wherein the tan delta at 60° C. is less than 0.120, wherein the abrasion volume loss (DIN) is less than 165 mm$^3$, and wherein the tensile at break values are greater than 13.0 MPa.

18. A process for preparing a rubber compound comprising admixing a halobutyl elastomer, at least one additional elastomer, a mineral filler and an at least three component mixed modifier system comprising a silane, a phosphine and an additive comprising at least one hydroxyl group and a functional group comprising a basic amine.

19. The process according to claim 18, wherein the three components of the mixed modifier system, or portions thereof, are pre-mixed.

20. The process according to claim 18, wherein the three components of the mixed modifier system are admixed with a pre-mixed combination of the halobutyl elastomer, the at least one additional elastomer and the mineral filler.

* * * * *